United States Patent
Gorman

(10) Patent No.: US 12,282,036 B2
(45) Date of Patent: Apr. 22, 2025

(54) TOTAL LAB AUTOMATION SYSTEM

(71) Applicant: Team Conveyer Royalty A LLC, Del Mar, CA (US)

(72) Inventor: John G. Gorman, Del Mar, CA (US)

(73) Assignee: Team Conveyer Royalty A LLC, Del Mar, CA (US)

( * ) Notice: Subject to any disclaimer, the term of this patent is extended or adjusted under 35 U.S.C. 154(b) by 0 days.

(21) Appl. No.: 18/596,266

(22) Filed: Mar. 5, 2024

(65) Prior Publication Data

US 2024/0345118 A1   Oct. 17, 2024

Related U.S. Application Data

(60) Provisional application No. 63/458,738, filed on Apr. 12, 2023.

(51) Int. Cl.
*G01N 35/04*  (2006.01)
*G01N 35/00*  (2006.01)

(52) U.S. Cl.
CPC ....... *G01N 35/04* (2013.01); *G01N 35/00584* (2013.01); *G01N 2035/0493* (2013.01)

(58) Field of Classification Search
CPC ............. G01N 35/04; G01N 35/00584; G01N 2035/0493; G01N 2035/0413; G01N 2035/0401; G01N 2035/0406; G01N 35/02; G01N 35/026; G01N 35/028
USPC ....... 198/339.1, 750.2; 436/180; 422/63, 65, 422/67; 73/864.23, 864.24, 864.25, 73/864.81
See application file for complete search history.

(56) References Cited

U.S. PATENT DOCUMENTS

| | | | |
|---|---|---|---|
| 5,985,214 A * | 11/1999 | Stylli | G01N 35/1002 700/214 |
| 9,329,194 B2 | 3/2016 | Fritchie et al. | |
| 2007/0005169 A1 | 4/2007 | Röhnert et al. | |
| 2020/0278369 A1 | 9/2020 | Walker et al. | |
| 2020/0324974 A1 | 10/2020 | Gorman | |

OTHER PUBLICATIONS

International Search Report and Written Opinion mailed May 24, 2024 in PCT/US2024/018538, 14 pages.

* cited by examiner

*Primary Examiner* — Robert R Raevis
(74) *Attorney, Agent, or Firm* — Procopio, Cory, Hargreaves & Savitch LLP

(57) ABSTRACT

State-of-the-art analyzers in clinical laboratories require complex robotics, as well as daily human maintenance. In addition, a discrete analyzer is required for each analytic method, with two or more such analyzers containing expensive, redundant components. Accordingly, a total lab automation system is disclosed that is capable of combining the functions of all such analyzers using a compact superset of stations. In an embodiment, the system comprises a plurality of conveyors, arranged along an X-axis of a tabletop surface, and configured to move in both directions along a Y-axis, under the control of a controller. One or more stations may extend along the X-axis, to orthogonally span all of the conveyors, such that a tool of each station may move along the X-axis, and potentially along the Z-axis, to process items on the conveyors, under the control of the controller.

17 Claims, 8 Drawing Sheets

TOTAL LAB AUTOMATION SYSTEM

CROSS-REFERENCE TO RELATED APPLICATIONS

This application claims priority to U.S. Provisional Patent App. No. 63/458,738, filed on Apr. 12, 2023, which is hereby incorporated herein by reference as if set forth in full.

BACKGROUND

Field of the Invention

The embodiments described herein are generally directed to lab automation, and, more particularly, to an automated system that utilizes coordinated conveyors to analyze samples for an entire lab.

Description of the Related Art

Before automation, for a clinical laboratory to analyze samples (e.g., tissue samples), technologists would have to work at lab benches, manually centrifuging samples, unsealing and resealing samples, placing samples in racks, making aliquots, fetching reagents and fluid containers, cuvettes, and pipette tip racks, pipetting reagents and samples into the cuvettes, washing particles and red cells, moving cuvettes to and from incubators and centrifuges, moving cuvettes to result readers, recording results, and the like. Today, there are large laboratories that utilize, for example, a FlexLab™ track system from Inpeco SA of Novazzano, Switzerland, to move samples between large, expensive, floor-standing analyzers, such as the Cobas® 3800 from Roche Diagnostics Corp., of Indianapolis, Indiana. A large commercial laboratory can measure as many as 900 analytes by the main analytic methods: urinalysis, hemostasis, immunology, allergy, chemistry-ion-selective-electrode, hematology, molecular, and microbiology. Each of these analytic methods requires its own dedicated, expensive analyzer, which requires daily human maintenance (e.g., restocking), and contains complex robotics for pre-analytic, analytic, and post-analytic functions. The present disclosure is directed to solving one or more problems in these systems discovered by the inventor.

SUMMARY

In an embodiment, a total lab automation system comprises: a tabletop surface within a first plane that contains an X-axis and a Y-axis that is orthogonal to the X-axis; a plurality of conveyors mounted on the tabletop surface and arranged along the X-axis, wherein each of the plurality of conveyors extends along the Y-axis and is configured to move linearly and independently in two directions along the Y-axis, and wherein each of the plurality of conveyors comprises a top surface that is configured to hold a plurality of items; one or more stations that each extends along the X-axis to orthogonally span all of the plurality of conveyors, wherein each of the one or more stations comprises at least one tool that is configured to move in two directions along the X-axis; and a controller configured to control movement of each of the plurality of conveyors along the Y-axis, independently of any others of the plurality of conveyors, and movement of the tool of each of the one or more stations along the X-axis.

The tool of at least one of the one or more stations may be configured to move in two directions along a Z-axis that is orthogonal to both the X-axis and the Y-axis.

The controller may be further configured to: determine to co-locate two or more items, wherein each of the two or more items is held on a respective one of the plurality of conveyors that is different from any of the plurality of conveyors on which any of the other two or more items are held; for each of the two or more items, identify a position of that item on the respective conveyor; and move one or more of the respective conveyors on which the two or more items are held, until the positions of all of the two or more items are aligned along the X-axis. The controller may be configured to move the one or more of the respective conveyors on which the two or more items are held, until the positions of all of the two or more items are aligned along the X-axis with one of the one or more stations. The controller may be further configured to, once all of the two or more items are aligned along the X-axis with the one station, control the tool of the one station to perform an operation using each of the two or more items. The controller may be further configured to: determine a time at which to co-locate the two or more items; and control the respective conveyors on which the two or more items are held, so that the positions of all of the two or more items become aligned along the X-axis at the determined time.

The top surfaces of all of the plurality of conveyors may be located in a second plane that is parallel to the first plane.

Each of the one or more stations may comprise a bridge that orthogonally spans over all of the plurality of conveyors.

The plurality of conveyors may comprise at least one sample conveyor whose top surface is configured to hold a plurality of samples as the plurality of items, at least one reagent conveyor whose top surface is configured to hold a plurality of reagents as the plurality of items, and at least one testing conveyor whose top surface is configured to hold a plurality of test wells as the plurality of items. The at least one testing conveyor may be positioned between the at least one sample conveyor and the at least one reagent conveyor along the X-axis.

The top surface of each of the plurality of conveyors may be divided into a plurality of segments along the Y-axis.

The one or more stations may be a plurality of stations, wherein a first subset of the plurality of stations is configured to perform a first analysis, and wherein a second subset of the plurality of stations is configured to perform a second analysis that is different from the first analysis. The first analysis may be performed according to a first one of a plurality of analytic methods, the second analysis may be performed according to a second one of the plurality of analytic methods that is different from the first analytic method, and the plurality of analytic methods may comprise two or more of urinalysis, hemostasis, immunology, allergy, chemistry, ion selective electrode (ISE), hematology, molecular, or microbiology.

Each of the plurality of items may be associated with a place-time identifier, wherein the place-time identifier, for each of the plurality of items held on the top surface of one of the plurality of conveyors, comprises: a surface vector that identifies a relative location of the item on the top surface of the conveyor; and a time vector that identifies a time at which the item is at the relative location identified in the surface vector. Each of a plurality of events in the total lab automation system may be associated with a place-time identifier, wherein the place-time identifier for each of the plurality of events comprises: a surface vector that identifies a location of the event; and a time vector that identifies a time at which the event occurred or is to occur. The controller may be further configured to manage an event table that comprises place-time identifiers for a set of planned events in a future time period. The controller may be further configured to: monitor the plurality of events; and in response to an occurrence of a particular event within the plurality of events, automatically trigger one or more actions.

Each of the plurality of conveyors may comprise a rack-and-pinion system configured to move the top surface along the Y-axis, wherein the rack-and-pinion system is driven by a motor that is actuated by the controller.

In an embodiment, a method comprises, in a total lab automation system that comprises a tabletop surface within a first plane that contains an X-axis and a Y-axis that is orthogonal to the X-axis, a plurality of conveyors mounted on the tabletop surface and arranged along the X-axis, wherein each of the plurality of conveyors extends along the Y-axis and is configured to move linearly and independently in two directions along the Y-axis, and wherein each of the plurality of conveyors comprises a top surface that is configured to hold a plurality of items, one or more stations that each extends along the X-axis to orthogonally span all of the plurality of conveyors, wherein each of the one or more stations comprises at least one tool that is configured to move in two directions along the X-axis, and a controller, using at least one hardware processor of the controller to: determine to co-locate two or more items, wherein each of the two or more items is held on a respective one of the plurality of conveyors that is different from any of the plurality of conveyors on which any of the other two or more items are held; for each of the two or more items, identify a position of that item on the respective conveyor; and move one or more of the respective conveyors on which the two or more items are held, until the positions of all of the two or more items are aligned along the X-axis with one of the one or more stations. The method may further comprise using the at least one hardware processor of the controller to move the tool of the one station along the X-axis and a Z-axis that is orthogonal to both the X-axis and the Y-axis, to complete an operation on the two or more items.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

A total lab automation system is disclosed in various embodiments. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Total Lab Automation System

Figure 1:
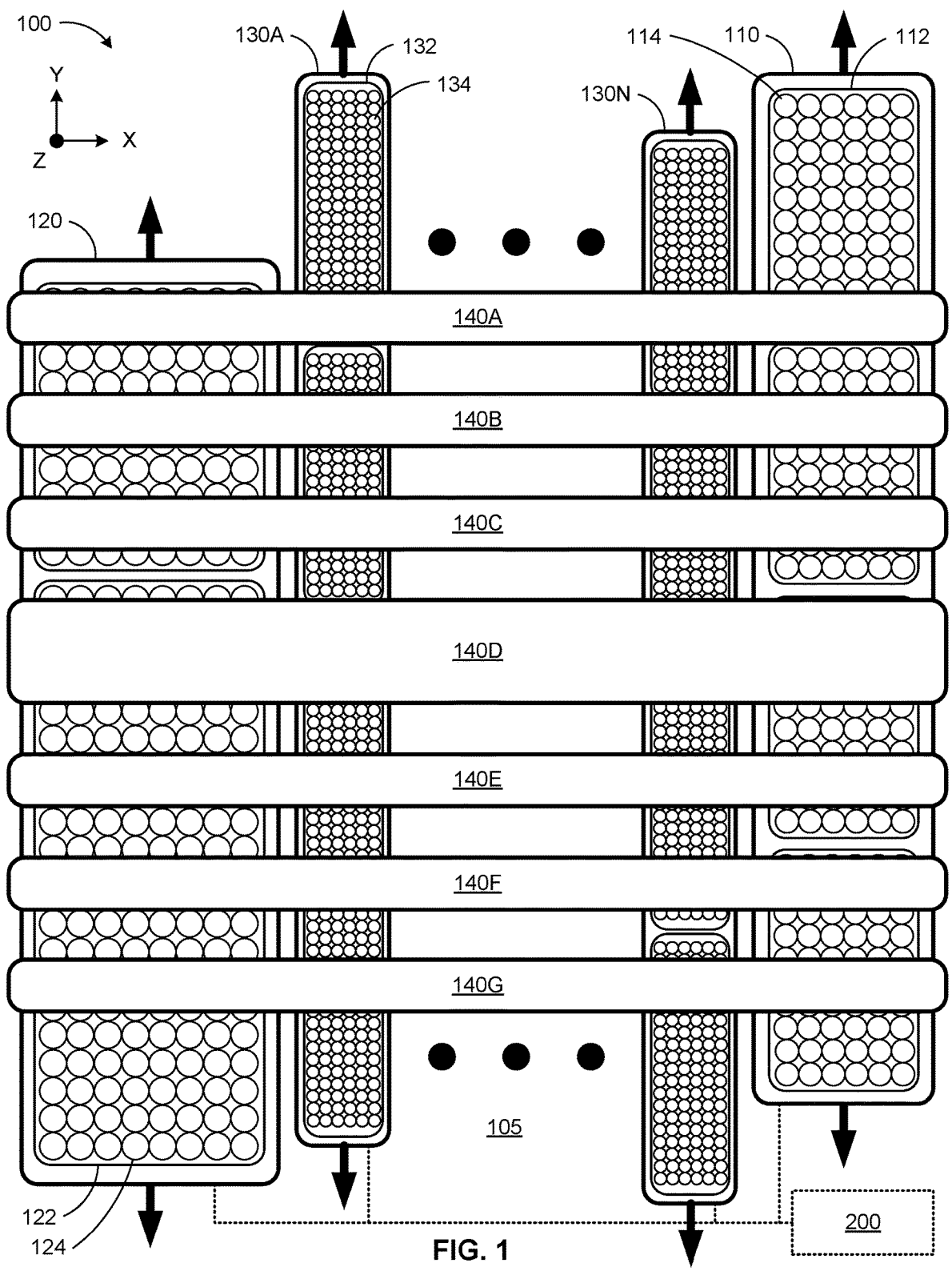
FIG. 1 illustrates a plan view of a total lab automation system, according to an embodiment.

FIG. 1 illustrates a plan view of a total lab automation system 100, according to an embodiment. Total lab automation system 100 comprises a tabletop surface 105 within a plane that contains an X-axis and a Y-axis that is orthogonal to the X-axis. It should be understood that this plane is orthogonal to a Z-axis, which is orthogonal to both the X-axis and the Y-axis. A plurality of conveyors are mounted on tabletop surface 105 and arranged along the X-axis. Each of the plurality of conveyors extends along the Y-axis and comprises a top surface that is configured to hold a plurality of items. The plurality of items may include samples, reagents, test wells, and/or the like. The top surfaces of all of the plurality of conveyors may be located in a plane that is parallel to and above (i.e., along the Z-axis) the plane of tabletop surface 105. As used herein, the term "along," when used with respect to an axis, should be understood to mean in the same orientation as or parallel to that axis, as opposed to requiring coaxiality with any particular axis. For instance, "along the X-axis" means parallel to any particular instance of the X-axis, "along the Y-axis" means parallel to any particular instance of the Y-axis, and "along the Z-axis" means parallel to any particular instance of the Z-axis.

As illustrated, the plurality of conveyors may comprise at least one sample conveyor 110, at least one reagent conveyor 120, and/or at least one testing conveyor 130. Each sample conveyor 110 may comprise a top surface that is configured to hold a plurality of samples 114, each reagent conveyor 120 may comprise a top surface that is configured to hold a plurality of reagents 124, and each testing conveyor 130 may comprise a top surface that is configured to hold a plurality of test wells 134 (e.g., cuvettes, microplates, etc.) in which samples and reagents can be combined and analyzed. As used herein, the term "conveyor" alone may refer to any one of sample conveyor 110, reagent conveyor 120, or testing conveyor 130, and the term "conveyors" may refer collectively to two or more of sample conveyors 110, reagent conveyors 120, and/or testing conveyors 130. These terms may be used when the particular type of conveyor is not essential to an understanding of the described embodiment.

In an embodiment, total lab automation system 100 could consist of one sample conveyor or comprise a plurality of sample conveyors, consist of one reagent conveyor 120 or comprise a plurality of reagent conveyors 120, and/or consist of one testing conveyor 130 or comprise a plurality of testing conveyors 130. In the illustrated embodiment, total lab automation system 100 consists of one sample conveyor 110, consists of one reagent conveyor 120, and comprises a plurality of testing conveyors 130, represented by testing conveyors 130A, . . . 130N. It should be understood that this is simply one example, and that the number of each type of conveyor may be determined according to one or more design factors, such as the number of samples 114, reagents 124, and test wells 134 to be stored within total lab automation system 100, the number of items to be aligned at once, and/or the like. For example, if more of a certain type of item is desired to be stored and/or aligned in total lab automation system 100, the number of conveyors for that that type of item in total lab automation system 100 may be increased.

It should be understood that total lab automation system 100 could alternatively or additionally comprise one or more other types of conveyors than those specifically described herein. For example, one or more conveyors may comprise other types of items, such as accessories to be used during analysis, such as clean and/or used pipette tips, cleansing wells, disposal wells, vessels of other fluids, and/or the like. Alternatively, such accessories may be provided on designated regions of sample conveyor(s) 110, reagent conveyor(s) 120, and/or testing conveyor(s) 130.

In the illustrated embodiment, sample conveyor 110 and reagent conveyor 120 are positioned on opposite sides of total lab automation system 100, with testing conveyor(s) 130 positioned between sample conveyor 110 and reagent conveyor 120, along the X-axis. However, it should be understood that this is simply one example, and that the arrangement of the conveyors may be determined according to one or more design factors. In particular, each sample conveyor 110, reagent conveyor 120, and testing conveyor 130 may arranged in any manner along the X-axis. For example, in alternative embodiments, sample conveyor 110 and reagent conveyor 120 may be adjacent on one side of testing conveyor(s) 130, sample conveyor 110 and reagent conveyor 120 may be interleaved with one or more testing conveyors 130, sample conveyor 110 and/or reagent conveyor may be positioned between two or more testing conveyors 130, or the like. However, it may generally be more efficient for testing conveyor(s) 130 to be positioned between a sample conveyor 110 and a reagent conveyor 130, along the X-axis, since this will minimize the movement required to mix samples 114 from sample conveyor 110 and reagents 124 from reagent conveyor 120 within testing wells 134 on testing conveyor 130.

Each conveyor may have the same dimensions as one or more other conveyors and/or different dimensions than one or more other conveyors. For example, in the illustrated embodiment, each testing conveyor 130 has the same dimensions as every other testing conveyor 130, and is narrower (i.e., along the X-axis) and longer (i.e., along the Y-axis) than sample conveyor 110, which is narrower and longer than reagent conveyor 120. It should be understood that this is simply one example, and that the dimensions of each conveyor may be determined according to one or more design factors, such as the number of samples 114, reagents 124, and test wells 134 to be stored within total lab automation system 100. For example, if more of a certain type of item is desired to be stored in total lab automation system 100, the conveyor(s) for that that type of item may be increased in dimension. In an alternative embodiment, each conveyor may have identical dimensions as every other conveyor.

The top surface of each of the plurality of conveyors may be divided into one or more, and generally a plurality of, segments, along the Y-axis. Each segment in a conveyor may have identical dimensions to every other segment in that conveyor. However, one conveyor may have segments with different dimensions than the segments of one or more other conveyors. For example, in the illustrated embodiment, reagent conveyor 120 has larger segments than sample conveyor 110, which has larger segments than testing conveyors 130, which each have identically sized segments. It should be understood that this is simply one example, and that the dimensions of the segments in each conveyor may be determined according to one or more design factors. In an alternative embodiment, each conveyor could have segments of identical dimensions as the segments in every other conveyor.

Each segment in the top surface of each conveyor may be configured to support a tray of the respective type of item. In an embodiment, each segment has corresponding dimensions to each tray of the respective type of item, such that each segment is configured to support a single tray of the respective type of item. For example, each segment of sample conveyor 110 supports a single sample tray 112 that holds a plurality of samples 114, each segment of reagent conveyor 120 supports a single reagent tray 122 that holds a plurality of reagents 124, and each segment of testing conveyor 130 supports a single testing tray 132 that holds a plurality of test wells 134. As used herein, the term "tray" alone may refer to any one of sample trays 112, reagent trays 122, and testing trays 132, and the term "trays" may refer collectively to two or more sample trays 112, reagent trays 122, and/or testing trays 132. These terms may be used when the particular type of tray is not essential to an understanding of the described embodiment.

The dimensions of each tray may be dictated by the dimensions of the segments that support that tray. For example, in plan view, the dimensions of each sample tray 112 may be configured to be equal to or slightly less than the dimensions of the segments in sample conveyor 110, the dimensions of each reagent tray 122 may be configured to be equal to or slightly less than the dimensions of the segments in reagent conveyor 120, and the dimensions of each testing tray 132 may be configured to be equal to or slightly less than the dimensions of the segments in testing conveyor 130, such that each tray is configured to fit within its respective segment.

Each tray may comprise or consist of a rack with a bottom substrate, legs, or other support mechanism that is configured to rest on top of a segment of the top surface of the respective conveyor, and a top substrate that is supported by the support mechanism and is configured to hold containers of the respective type of item above the top surface of the respective conveyor. For example, each sample tray 112 may hold a plurality of containers (e.g., tubes) of samples 114, each reagent tray 122 may hold a plurality of containers (e.g., tubes) of reagents 124, and each testing tray 132 may hold a plurality of test wells 134. It should be understood that a single sample tray 112 may hold samples 114 for a plurality of different patients or other subjects, a single reagent tray 122 may hold a plurality of different types of reagents 124 that are used to analyze samples 114, and a single testing tray 132 may hold test wells 134 (e.g., cuvettes, microplates, etc.) that can each be used to combine a sample 114 with one or more reagents 124. Each tray may be configured to hold any number of items, and preferably, between one-hundred and four-hundred items.

Each conveyor may be configured to move linearly and independently in two directions along the Y-axis, under the control of a controller 200. For example, each sample conveyor 110, reagent conveyor 120, and testing conveyor 130 may comprise a rack-and-pinion system or other suitable movement mechanism, on the underside of the top surface of the conveyor (i.e., along the Z-axis), that is configured to move the top surface of the conveyor, including all of the segments of the conveyor, one-dimensionally, in both directions along the Y-axis. Each movement mechanism may be driven by an independent stepper motor, servo motor, or other drive mechanism that can be actuated in either one of the two directions by controller 200. Thus, controller 200 is configured to control movement of each of the plurality of conveyors, one-dimensionally in two directions along the Y-axis, and independently of any other ones of the conveyors. Notably, this type of movement is many times simpler, faster, cheaper, and more reliable than the robotics of state-of-the-art systems which require movement in two or three dimensions, and allows for a much wider range of movement than the robotics of state-of-the-art systems.

It should be understood that the trays of items on the segments of the top surface of a conveyor will move with the top surface of that conveyor, under the control of controller 200. For example, as sample conveyor 110 moves along the Y-axis, each sample tray 112, including each sample 114 in that sample tray 112, will remain fixed on its supporting segment, such that the sample tray 112 and its samples 114 move along the Y-axis by the same displacement amount as the sample conveyor 110. Similarly, as reagent conveyor 120 moves along the Y-axis, each reagent tray 122, including each reagent 124 in that reagent tray 122, will remain fixed on its supporting segment, such that the reagent tray 122 and its reagents 124 move along the Y-axis by the same displacement amount as the reagent conveyor 120. Similarly, as testing conveyor 130 moves along the Y-axis, each testing tray 132, including each test well 134 in that testing tray 132, will remain fixed on its supporting segment, such that the testing tray 132 and its test wells 134 move along the Y-axis by the same displacement amount as the testing conveyor 130. In other words, each item can be moved along the Y-axis by moving the corresponding conveyor.

Total lab automation system 100 may comprise a tabletop (e.g., substrate) having tabletop surface 105 as its top, vertically-upward-facing surface, with each conveyor mounted on tabletop surface 105. In particular, the movement mechanism (e.g., rack-and-pinion system) of each conveyor and the drive mechanism (e.g., stepper motor, servo motor, etc.) of each movement mechanism may be mounted on tabletop surface 105, with the top surface of the conveyor mounted on and above the movement mechanism. Controller 200 may be mounted above, within, below, or to the side of, the tabletop, in a discrete and/or external housing, or in some other manner.

The range of one-dimensional movement, along the Y-axis by each conveyor, may be limited, such that a profile of the conveyor in plan view cannot move outside the profile of tabletop surface 105 or cannot move beyond a certain range outside of the profile of tabletop surface 105. The range of movement may be the same for each conveyor or different for two or more conveyors. The range of movement of a conveyor may be dictated by the dimensions of the conveyor, the dimensions of tabletop surface 105, the desired footprint of total lab automation system 100, and/or one or more other design factors.

Total lab automation system 100 may comprise one or more stations 140, illustrated as stations 140A, 140B, 140C, 140D, 140E, 140F, and 140G. It should be understood that total lab automation system 100 may comprise any number of stations 140. For example, total lab automation system 100 may consist of a single station 140 or comprise any plurality of stations 140, including less than the seven illustrated stations 140 or more than the seven illustrated stations 140. In addition, each station 140 may have identical dimensions as one or more other stations 140, and/or different dimensions than one or more other stations 140. Furthermore, each station 140 is illustrated as being positioned at equidistant intervals along the Y-axis from adjacent stations 140. However, stations 140 could be positioned in any manner along the Y-axis, including at non-equidistant or irregular intervals, according to one or more design factors.

Each station 140 may be oriented, so as to extend along the X-axis to orthogonally span all of the plurality of conveyors. For example, each station 140 may comprise a bridge that orthogonally spans over all of the plurality of conveyors (i.e., above each conveyor along the Z-axis), so as to be transverse to or cross all of the conveyors in plan view. Alternatively, one or more, including potentially all of, stations 140 may orthogonally span below all of the plurality of conveyors (i.e., below each conveyor along the Z-axis). In this case, it should be understood that each station 140 would still be transverse to or cross all of the conveyors in plan view.

Each station 140 may comprise at least one tool that is configured to perform at least one operation of a task. The task may comprise an analysis according to an analytic method, such as one of the main analytic methods discussed herein, a step within such an analysis, reading a result of such an analysis, and/or the like. Examples of the tool include, without limitation, a pipette, robotic grabber, contact sensor, camera, photometer, spectrophotometer, thermometer, other type of sensor, and/or the like. The tool may be configured to move in two directions along the X-axis, under the control of controller 200. For example, in the case that station 140 extends orthogonally above the conveyors, the tool may slide along the X-axis on the underside of station 140. In the case that station 140 extends orthogonally below the conveyors, the tool may slide along the X-axis on the topside of station 140. In either case, the tool may be fixed to a conveyor that moves in both directions along the X-axis. Controller 200 may be configured to control the movement of the tool of each station 140 along the X-axis, independently of the tool of any other station 140. A point (e.g., bottommost or uppermost point) on each tool of each substation 140 may lie in the same X-Y plane as a corresponding point on every other tool of every other substation 140.

In an embodiment, the tool of one or more, including potentially all of, stations 140 may be configured to move in two directions along the Z-axis, in addition to the X-axis. In other words, the tool may move in two dimensions. Such a tool could also be considered a conveyor along the Z-axis. The range of movement along the Z-axis for each tool of each substation 140 may be the same as or different from the range of movement along the Z-axis for one or more other tools of the same and/or other substations 140. In such an embodiment, conveyance is possible in three dimensions, without complicated robotics. In particular, an item and/or tool may be brought to any point along the X-axis, Y-axis, and Z-axis. This provides for very flexible and precise collocation of items and tools, according to billions of possible unique combinations.

It should be understood that whether or not the tool is designed to move along the Z-axis may depend on the type of tool. For example, a tool, such as a pipette, robotic grabber, sensor, or the like, which must contact or otherwise be proximate an item on a conveyor, may move along the Z-axis, so as to move vertically down towards the item (e.g., to draw fluid from or dispense fluid into a sample 114, reagent 124, or test well 134, measure an attribute of fluid in test well 134, etc.) and move vertically up to withdraw from the item. In this case, in an embodiment in which station 140 extends orthogonally above the conveyors, the tool may move along the underside of station 140 along the X-axis, to position itself above a particular item, lower itself along the Z-axis to contact or otherwise increase proximity to the item, perform an action (e.g., draw or dispense an item, sense an attribute of an item, etc.), raise itself along the Z-axis, and then move again along the underside of station 140 along the X-axis to another position at which a subsequent action can be performed. Controller 200 may be configured to control the movement of the tool of each station 140 along the X-axis and the Z-axis, independently of the tool of any other station 140. A tool, such as a camera or other sensor that does not require additional proximity to an item, may not need to move along the Z-axis, in which case the tool may be configured to move in only one dimension along the X-axis, under the control of controller 200. In some cases, a station 140 may comprise two or more tools that move along the X-axis, and potentially along the Z-axis, under the control of controller 200, to perform the same task as each other or to perform different tasks from each other.

A particular analysis may require the utilization of two or more stations 140. The main analytic methods include urinalysis, hemostasis, immunology, allergy, chemistry, ion selective electrode (ISE), hematology, molecular, and microbiology. It is contemplated that two or more stations 140 may be assigned as a single analytic module that implements a single one of these analytic methods. Each of one or more stations 140 may be shared by two or more analytic modules, to prevent or reduce redundancy in total lab automation system 100. It should be understood that, within an analytic module, one or more first stations 140 may perform pre-analytic processing (e.g., prepping samples 114 within a test well 134, for example, by mixing sample 114 with an analyte reagent 124), one or more second stations 140 may perform the analysis (e.g., according to one of the main analytic methods), and one or more third stations 140 may perform post-analytic processing (e.g., reading the results, such as imaging, measuring, or otherwise sensing some attribute of the mixture in test wells 134).

Thus, total lab automation system 100 may comprise a plurality of stations 140, with a first subset of the plurality of stations 140 configured to perform a first analysis (e.g., according to one of the main analytic methods), and a second subset of the plurality of stations 140 configured to perform a second analysis (e.g., according to another one of the main analytic methods) that is different from the first analysis. It should be understood that there may be a third subset of the plurality of stations 140 that is configured to perform a third analysis, a fourth subset of the plurality of stations 140 that is configured to perform a fourth analysis, and so on and so forth. Each subset represents an analytic module. In an embodiment, there could be an analytic module, comprising a subset of the plurality of stations 140, for each of the main analytic methods. The subsets of stations 140 in the analytic modules may be overlapping (i.e., with some stations 140 shared between two or more analytic modules) or non-overlapping (i.e., with each station 140 only be used in a single analytic module).

As an example, in hemostasis analysis, a sample 114 on sample conveyor 110 and an analyte reagent 124 on reagent conveyor 120 may be mixed in a test well 134 on test conveyor 130 at a set temperature by a pipette at a first station 140. Then, testing conveyor 130 may be moved along the Y-axis to move the test well 134 to a second station 140, which comprises a photometer as the tool. The photometer of the second station 140 may measure the time until clotting begins in the test well 134.

As another example, in immunology, a sample 114 on sample conveyor 110 and an analyte reagent 124 on reagent conveyor 120 may be mixed in a test well 134 on test conveyor 130 at a set temperature by a pipette at a first station 140. Then, testing conveyor 130 may be moved along the Y-axis to move the test well 134 to a second station 140, which incubates the test well 134 for a set time. Then, testing conveyor 130 may be moved along the Y-axis to move the test well 134 to a third station 140, which comprises a tool that injects chemiluminescence into the test well 134 and/or a tool (e.g., luminometer) that measures resulting luminescence in the test well 134.

As another example, in chemistry analysis, a sample 114 on sample conveyor 110 and an analyte reagent 124 on reagent conveyor 120 may be mixed in a test well 134 on test conveyor 130 at a set temperature by a pipette at a first station 140. Then, testing conveyor 130 may be moved along the Y-axis to move the test well 134 to a second station 140, which comprises a spectrophotometer that, after a set time interval from the mixing, reads a specific wavelength, associated with the analyte reagent 124, in the color of the mixture in test well 134.

As another example, in ISE analysis, samples 114 on sample conveyor 110 may be added to a row (i.e., along the X-axis) of test wells 134 on one or more testing conveyors 130 by a pipette at a first station 140. Then, testing conveyor(s) 130 may be moved along the Y-axis to move the row of test wells 134 to a second station 140, which comprises a tool that introduces ion selective electrodes to the test wells 134 in the row of test wells 134 and measures the ionic concentration of the samples in the test wells 134.

As another example, in hematology or cell sorting, samples 114 on sample conveyor 110 may be prepped in test wells 134 of a testing conveyor 130 at a first station 140. Then, testing conveyor 130 may be moved along the Y-axis to move the test wells 134 to a second station 140, which may aspirate the prepped samples from the test wells 134 into a standard hematology system or cell-sorting system.

As another example, in molecular analysis, samples 114 on sample conveyor 110 may be moved into test wells 134 of a testing conveyor 130 by a pipette at a first station 140. Then, the samples in test wells 134 may be moved to a series of one or a plurality of second stations 140, which each comprises a tool that extracts nucleic acids from the test wells 134 for amplification and follow-up testing.

Notably, total lab automation system 100 enables random access by a station 140, under the control of controller 200, to any arbitrary sample 114, reagent 124, and test well 134, stored on any conveyor within total lab automation system 100. In particular, any position on each of sample conveyor 110, reagent conveyor 120, and testing conveyor 130 can be moved along the Y-axis to any station 140, under the control of controller 200, to thereby align with that station 140 (e.g., under station 140 if station 140 comprises a bridge) along the X-axis. Advantageously, any combination of positions across any two or more conveyors may be co-located at a station 140. Depending on the number of items held by each of the conveyors, total lab automation system 100 may allow for thousands, millions, or billions of unique combinations, without the need for the discrete analyzers, human technicians, and complex robotics required by state-of-the-art systems.

In addition, positions on any set of conveyors may be aligned with each other along the X-axis. For example, any position on sample conveyor 110 may be aligned with any position on reagent conveyor 120 along the X-axis, any position on sample conveyor 110 may be aligned with any position on testing conveyor 130 along the X-axis, any position on reagent conveyor 120 may be aligned with any position on testing conveyor 130 along the X-axis, and any position on sample conveyor 110, any position on reagent conveyor 120, and any position on testing conveyor 130 may be aligned with each other along the X-axis. It should be understood that such alignment may also align with a station 140. For example, any position on sample conveyor 110, any position on reagent conveyor 120, and any position on testing conveyor 130 may be aligned with each other along the X-axis underneath a station 140 (if station 140 is above the conveyors) or above a station 140 (if station 140 is below the conveyors). More generally, any position on any conveyor may be aligned along the X-axis with any position on any other conveyor and/or with any station 140.

In an embodiment, the movement of each conveyor may be indexed, such that the conveyor can only stop at one of a plurality of indexed positions. In this case, if controller 200 stops a conveyor while conveyor is between two indexed positions, the conveyor will continue moving in the same direction, along the Y-axis, until the conveyor reaches the next indexed position, at which point the conveyor will stop. Each indexed position may be equidistant from each adjacent indexed position, but this is not a requirement. The indexed positions may differ for different conveyors or be the same for all conveyors. The number of indexed positions and the intervals of distance between indexed positions for a conveyor may be determined according to one or more design factors, such as the dimensions of the respective conveyor, the number of items held on the respective conveyor, and/or the like. For example, in the illustrated embodiment in which test wells 134 have smaller dimensions than samples 114, which have smaller dimensions than reagents 124, testing conveyor 130 may have more indexed positions with smaller distance intervals between indexed positions than sample conveyor 110, which may have more indexed positions with smaller distance intervals between indexed positions than reagent conveyor 120.

In an embodiment, for each conveyor, the dimensions and indexed positions are configured such that, at each indexed position, a row (i.e., along the X-axis) of items on the conveyor are aligned with each of stations 140 (e.g., with the central longitudinal axis, along the X-axis, of each station 140) that span the conveyor, such that at least one row is accessible to the tool of each station 140 that spans the conveyor. In other words, in this embodiment, no conveyor can stop at a position in which a station 140 that spans the conveyor is not able to access a row of items. It should be understood that, in some scenarios, there may be stations 140 which do not span the conveyor (e.g., when the conveyor is at an extreme end of its range along the Y-axis), and therefore, will not have access to any rows of items on the conveyor. However, in this embodiment, if a station 140 spans the conveyor, it will have access to at least one row of items on the conveyor.

It should be understood that stations 140 may operate in parallel on the rows of items that are accessible to them. For instance, each of stations 140A-140G may each work, independently from any other one of stations 140A-140G, on one or more items within at least one row along the X-axis. As an example, station 140A may mix samples 114 with reagents 124 in a row of test wells 134 spanned by station 140A, while simultaneously, station 140G reads the results in a row of tests wells 134 spanned by station 140G. Thus, a plurality of tasks may be independently performed by a plurality of stations 140 in parallel, to thereby increase throughput within total lab automation system 100.

2. Controller

Figure 2:
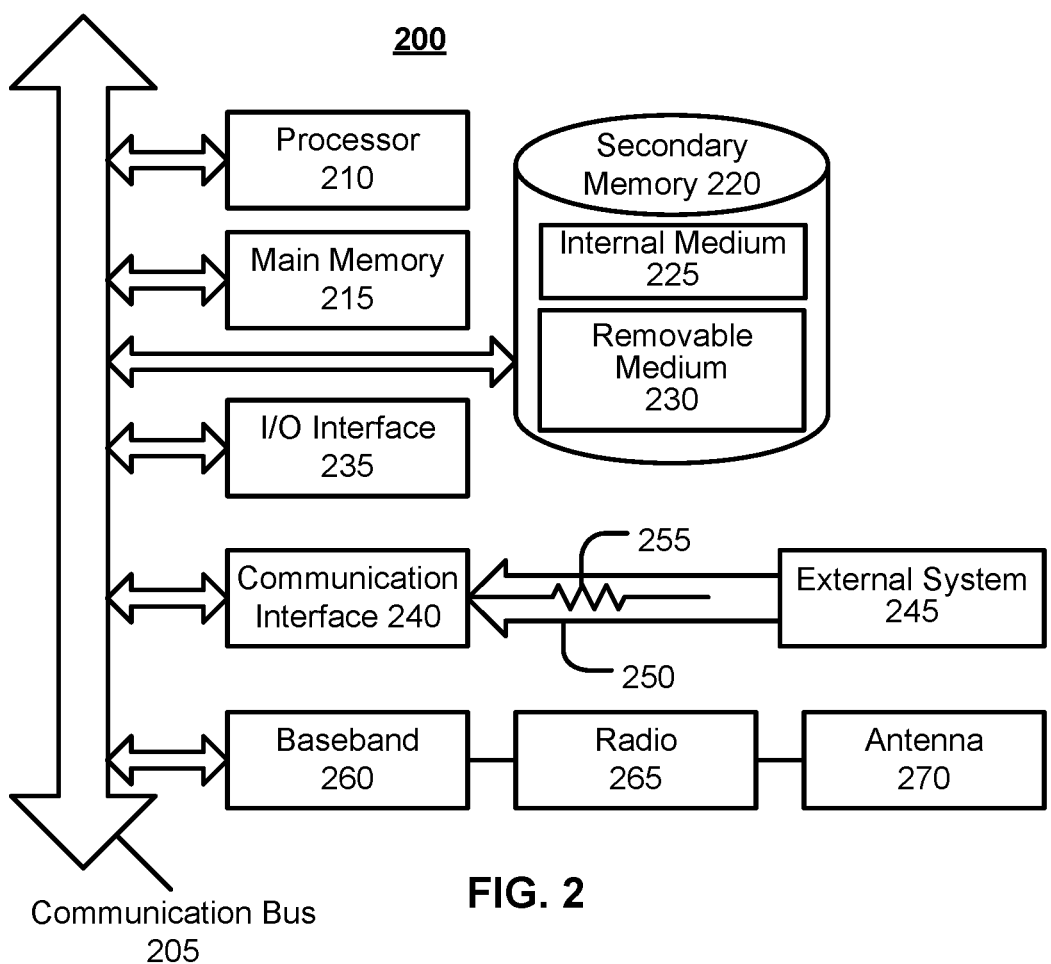
FIG. 2 illustrates a schematic of a controller, according to an embodiment.

FIG. 2 illustrates a schematic of a controller 200, according to an embodiment. Controller 200 may be used to control the conveyors (e.g., movement along the Y-axis) of total lab automation system 100, including sample conveyor(s) 110, reagent conveyor(s) 120, and testing conveyor(s) 130, and the tool(s) (e.g., movement along the X-axis and/or Z-axis) of each station 140 of total lab automation system 100, according to any of the disclosed processes. Controller 200 may be capable of wired or wireless data communication, such that controller 200 is able to communicate with one or more external systems. The illustrated embodiment is simply one example of controller 200. It should be understood that controller 200 may utilize any other suitable architecture, as will be clear to those skilled in the art.

Controller 200 may comprise one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 210. Examples of processors which may be used with controller 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 may be connected to a communication bus 205. Communication bus 205 may include a data channel for facilitating information transfer between storage and other peripheral components of controller 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

Controller 200 may comprise main memory 215. Main memory 215 provides storage of instructions and data for programs executing on processor 210, such as one or more of the processes described herein. It should be understood that programs stored in the memory and executed by processor 210 may be written and/or compiled according to any suitable language, including without limitation C/C++, Java, JavaScript, Perl, Python, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Controller 200 may comprise secondary memory 220. Secondary memory 220 is a non-transitory computer-readable medium having computer-executable code and/or other data (e.g., software implementing any of the disclosed processes) stored thereon. In this description, the term "computer-readable medium" is used to refer to any non-transitory computer-readable storage media used to provide computer-executable code and/or other data to or within controller 200. The computer software stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 220 may include an internal medium 225 and/or a removable medium 230. Internal medium 225 and removable medium 230 are read from and/or written to in any well-known manner. Internal medium 225 may comprise one or more hard disk drives, solid state drives, and/or the like. Removable storage medium 230 may be, for example, a magnetic tape drive, a compact disc (CD) drive, a digital versatile disc (DVD) drive, other optical drive, a flash memory drive, and/or the like.

Controller 200 may comprise an input/output (I/O) interface 235. I/O interface 235 provides an interface between one or more components of controller 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display.

Controller 200 may comprise a communication interface 240. Communication interface 240 allows software to be transferred between controller 200 and external devices (e.g. printers), networks, or other information sources. For example, computer-executable code and/or data may be transferred to controller 200, over one or more networks (e.g., including the Internet and/or an intranet), from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing controller 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 240 is generally in the form of electrical communication signals 255. These signals 255 may be provided to communication interface 240 via a communication channel 250 between communication interface 240 and an external system 245. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 215 and/or secondary memory 220. Computer-executable code can also be received from an external system 245 via communication interface 240 and stored in main memory 215 and/or secondary memory 220. Such computer-executable code, when executed, enable controller 200 to perform the various functions of the disclosed embodiments as described elsewhere herein.

In an embodiment that is implemented using software, the software may be stored on a computer-readable medium and initially loaded into controller 200 by way of removable medium 230, I/O interface 235, or communication interface 240. In such an embodiment, the software is loaded into controller 200 in the form of electrical communication signals 255. The software, when executed by processor 210, preferably causes processor 210 to perform one or more of the processes described herein.

Controller 200 may comprise wireless communication components that facilitate wireless communication over a data network. The wireless communication components may comprise an antenna system 270, a radio system 265, and a baseband system 260. In controller 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

Baseband system 260 is communicatively coupled with processor(s) 210, which have access to memory 215 and 220. Thus, software can be received from baseband processor 260 and stored in main memory 210 or in secondary memory 220, or executed upon receipt. Such software, when executed, can enable controller 200 to perform the various functions of disclosed processes.

Alternatively, controller 200 may be implemented as a purely hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, processes will be described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component (e.g., subprocess) are for ease of description. Specific functions can be moved from one component to another without departing from the invention.

3. Control Process

Figure 3:
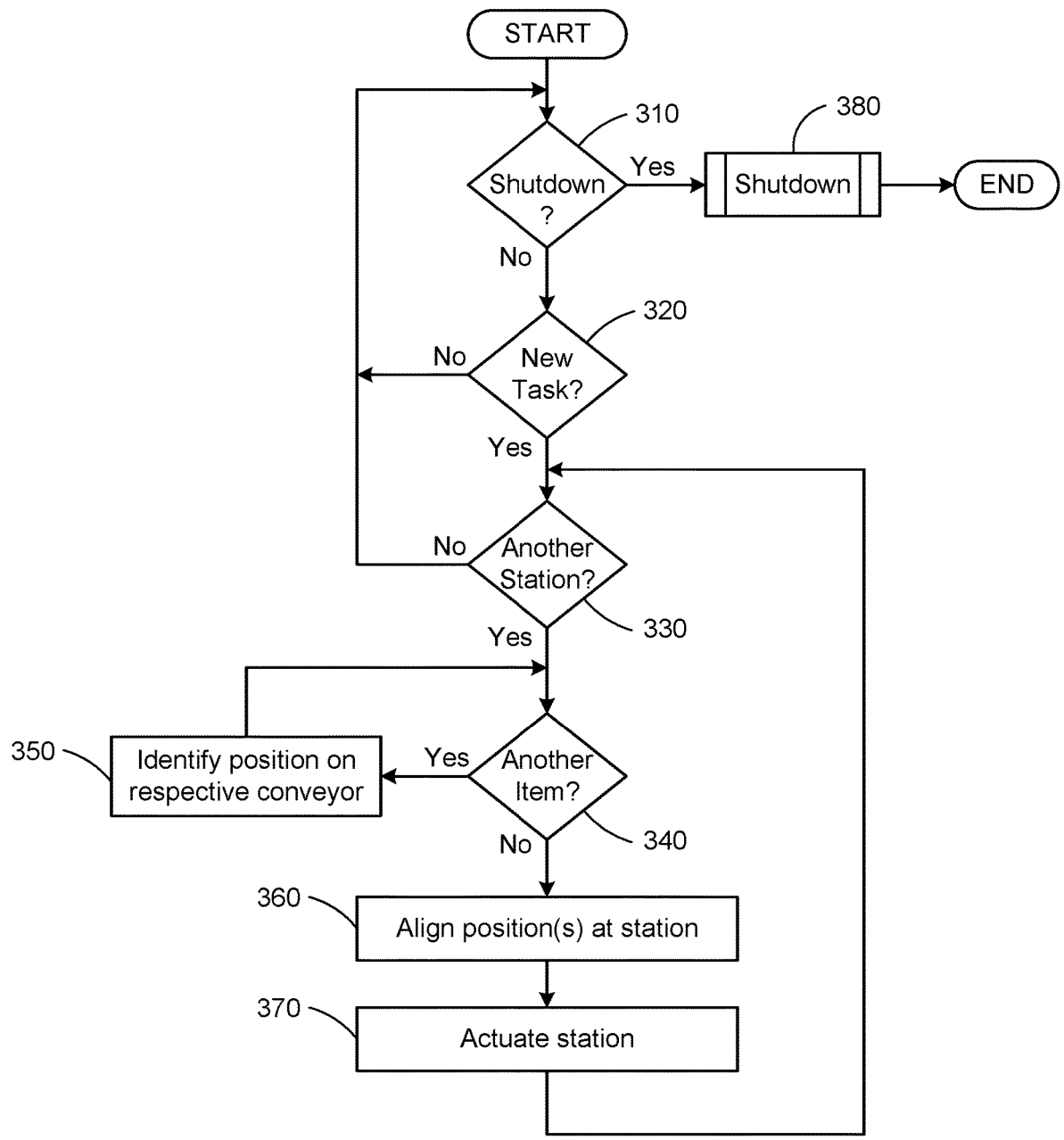
FIG. 3 illustrates a process for control of the conveyors of a total lab automation system by a controller, according to an embodiment.

FIG. 3 illustrates a process 300 for control of the conveyors of total lab automation system 100 by controller 200, according to an embodiment. In a preferred embodiment, process 300 is implemented as software that is executed by one or more hardware processors 210 of controller 200. Process 300 may be initiated when total lab automation system 100 is turned on, and may continue for as long as total lab automation system 100 remains on. While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 310, it is determined whether or not to shutdown total lab automation system 100. It may be determined to shutdown total lab automation system 100 in response to a manual local operation (e.g., depression of a physical power button, selection of a virtual power button in a graphical user interface on a touch-panel display of total lab automation system 100, etc.), manual remote operation (e.g., selection of a virtual power button in a graphical user interface of an external system 245 that is communicatively connected to controller 200 via communication interface 240), the occurrence of an automated trigger (e.g., a scheduled shutdown in a predefined operation schedule), the occurrence of a power outage, and/or the like. When not determining to shutdown (i.e., "No" in subprocess 310), process 300 may proceed to subprocess 320. Otherwise, when determining to shutdown (i.e., "Yes" in subprocess 310), process 300 may proceed to subprocess 380.

In subprocess 320, it is determined whether or not a task is to be performed. Tasks may be performed according to a predefined operation schedule that may be manually defined by an operator of total lab automation system 100 and/or automatically determined by controller 200 or an external system 245. Alternatively or additionally, tasks may be performed in response to the reception of a new order by controller 200, a local or remote manual operation, the occurrence of an event that triggers a new task, and/or the like. It should be understood that tasks may be performed in parallel when possible. In other words, a plurality of iterations of subprocesses 320-370 may be performed in parallel. When determining that a task is to be performed (i.e., "Yes" in subprocess 320), process 300 may proceed to subprocess 330. Otherwise, when determining that no task is to be performed (i.e., "No" in subprocess 320), process 300 may return to subprocess 310 to await either shutdown or a new task.

In subprocess 330, it is determined whether or not the current task requires operation of another station 140. In particular, a task may require the operation of one or more stations 140. For instance, a task may comprise an analysis (e.g., according to one of the main analytic methods) by an analytic module that comprises one or a plurality of stations 140. In the event that the analytic module comprises a plurality of stations 140, at least one first station 140 may perform pre-analytic processing (e.g., mixing a sample 114 with a reagent 124 or other element), at least one second station 140 may perform analytic processing (e.g., adding one or more reagents and/or other fluids, heating or cooling the mixture, centrifuging the mixture, etc.), and at least one third station 140 may perform post-analytic processing (e.g., sensing, imaging, or otherwise reading a result of the mixture). When the current task requires operation of another station 140 (i.e., "Yes" in subprocess 330), process 300 may proceed to subprocess 340. Otherwise, when the current task does not require operation of another station 140 (i.e., "No" in subprocess 330), the current task may be considered complete, and process 300 may return to subprocess 310 to await either shutdown or a new task.

In subprocess 340, it is determined whether or not another item must be moved to the current station 140 for the operation of the current station 140. In particular, the operation of the current station 140 may require a single item (e.g., test well 134), two items (e.g., sample 114 and reagent 124, sample 114 and test well 134, reagent 124 and test well 134, etc.), three items (e.g., sample 114, reagent 124, and test well 134), four or more items, one or more rows of items, or the like. It should be understood that, for an operation on two or more items, each of the two or more items or each type of items may be located on one of the plurality of conveyors that is different from any of the plurality of conveyors on which any of the other two or more items or types of items are held. When another item is to be moved to the current station 140 (i.e., "Yes" in subprocess 340), process 300 may proceed to subprocess 350. Otherwise, when no more items are to be moved to the current station 140 (i.e., "No" in subprocess 340), process 300 may proceed to subprocess 360.

In subprocess 350, the position of the current item on a respective conveyor may be identified. For example, if the item is a sample 114, the current position of that sample 114 on sample conveyor 110 may be identified, if the item is a reagent 124, the current position of that reagent 124 on reagent conveyor 120 may be identified, and if the item is a test well 134, the current position of that test well 134 on testing conveyor 130 may be identified. Each item may be stored in association with a current place-time identifier (PTID), described in greater detail elsewhere herein, that identifies the position of item at the current time. Thus, controller 200 may acquire an item identifier of the item to be moved, retrieve the current PTID associated with that item identifier, and determine the position of the item from the retrieved PTID.

In subprocess 360, the position of each item that must be moved to the current station 140 is aligned, along the X-axis, at the current station 140. In particular, for each item to be moved, controller 200 may control the conveyor, on which that item is held, to move the position of the item along the Y-axis in the direction that is towards the current station 140. For example, for a sample 114, controller 200 may control the sample conveyor 110 on which the sample 114 is held, for a reagent 124, controller 200 may control the reagent conveyor 120 on which the reagent 124 is held, and for a test well 134, controller 200 may control the testing conveyor 130 on which the test well 134 is held. In the event that there are a plurality of items to be moved on different conveyors, controller 200 may move the respective conveyors in parallel.

In subprocess 370, once all position(s) have been aligned along the X-axis at the current station 140, the current station 140 may be actuated so as to perform an operation towards completion of the current task. In particular, controller 200 may control the tool of the current station 140 to perform an operation using each of the item(s) whose positions have been aligned along the X-axis at the current station 140. This operation may comprise mixing a sample 114 with a reagent 124 or other element in a testing well 134, reading an attribute of a mixture in a testing well 134, and/or the like. Once the operation is complete, process 300 may return to subprocess 330 to determine whether or not one or more of the items that were operated upon need to be moved to another station 140 to complete the current task.

In subprocess 380, total lab automation system 100 may perform shutdown processing. The shutdown processing may comprise moving one or more of the plurality of conveyors and/or tools to respective initialization positions, and/or otherwise placing the components of total lab automation system 100 into a suitable state for shutdown. For example, if controller 200 is in the process of performing a task at one or more stations 140, before shutting down total lab automation system 100, controller 200 may complete tasks and/or terminate tasks in a manner that does not leave any items or tools at risk of damage or contamination should total lab automation system 100 be moved, bumped, or the like. The shutdown processing may also comprise storing any unsaved data in main memory 215 to secondary memory 220 before shutting down total lab automation system 100, such that the data persist for future operations of total lab automation system 100.

4. Example Operation

In a typical operation of total lab automation system 100, controller 200 may determine, for a given task, to co-locate two or more items, which are each held on a respective one of the plurality of conveyors that is different from any of the plurality of conveyors on which any of the other two or more items are held. Controller 200 may, for each of the two or more items, identify the position of that item on the respective conveyor (e.g., in subprocess 350). Then, controller 200 may move one or more of the respective conveyors on which the two or more items are held, until the positions of all of the two or more items are aligned along the X-axis (e.g., in subprocess 360). In particular, controller 200 may move one or more of the respective conveyors on which the two or more items are held, until the positions of all of the two or more items are aligned along the X-axis with one of stations 140. Controller 200 may, once all of the two or more items are aligned along the X-axis with the station 140, control the tool of that station 140 to perform an operation (e.g., as part of an overarching task, such as an analysis) using each of the two or more items (e.g., in subprocess 370).

FIGS. 4A-4D illustrate the operation of total lab automation system 100 during the performance of a single exemplary task, according to an embodiment. In the illustrated embodiment, the task is an analysis that involves two stations 140X and 140Y. It will be assumed that the task comprises mixing a sample 114A with a reagent 124A in a test well 134A, and then reading the result. Controller 200 may determine to perform the task in response to a command from an operator or external system 245, according to a predefined operation schedule, or the like.

Figure 4A:
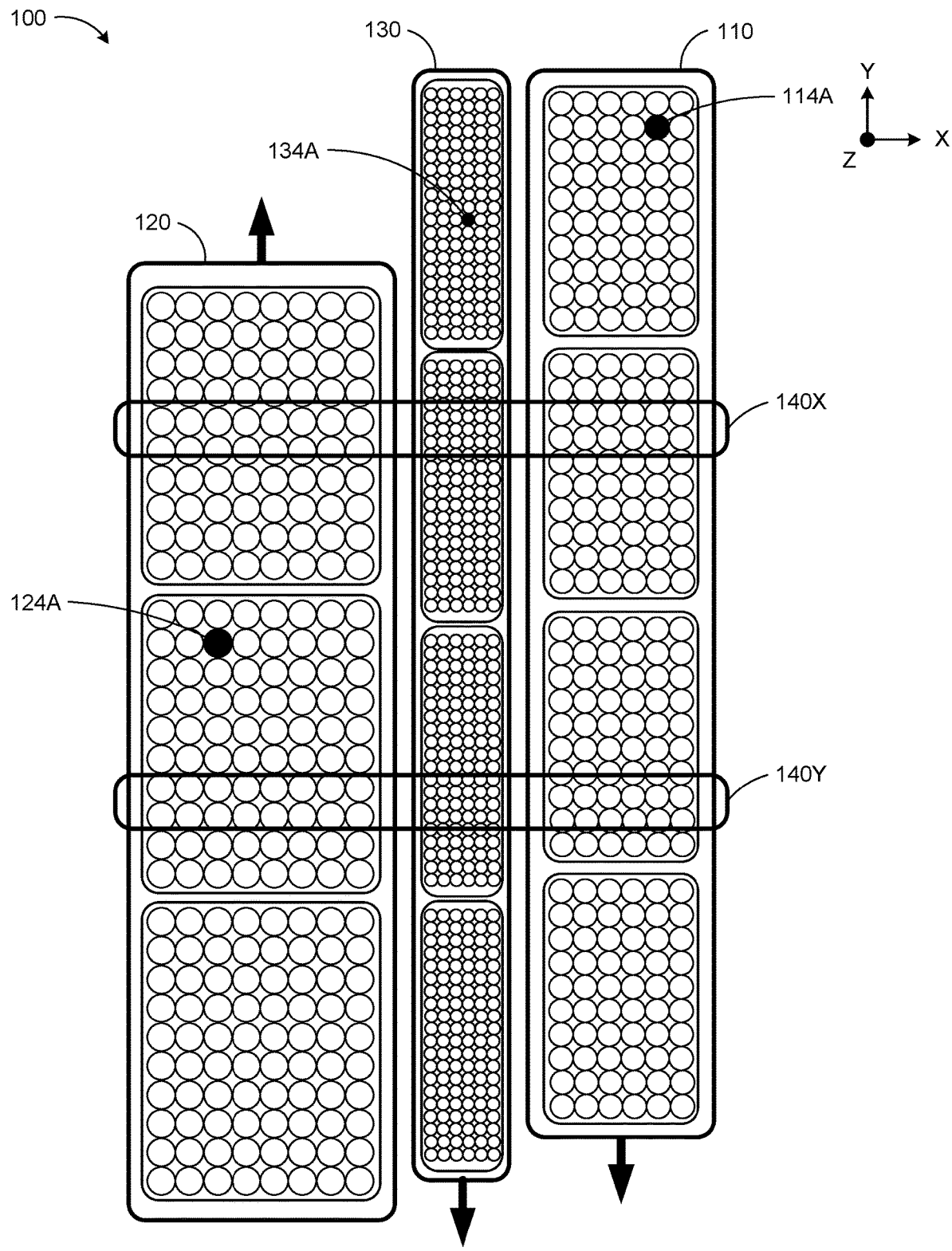
FIGS. 4A-4D illustrate the operation of a total lab automation system during the performance of a single exemplary task, according to an embodiment.

Initially, as illustrated in FIG. 4A, controller 200 will identify the positions of the sample 114A and the reagent 124A to be mixed. In addition, controller 200 will identify the position of an empty test well 134A that can be used to combine sample 114A and reagent 124A. For example, controller 200 may determine a sample identifier associated with sample 114A and a reagent identifier associated with reagent 124A. Controller 200 may retrieve the most recently stored PTID (e.g., from main memory 215 or secondary memory 220) that is associated with the sample identifier of sample 114A, and use the position indicated in the retrieved PTID as the position of sample 114A. Similarly, controller 200 may retrieve the most recently stored PTID (e.g., from main memory 215 or secondary memory 220) that is associated with the reagent identifier of reagent 124A, and use the position indicated in the retrieved PTID as the position of reagent 124A. In addition, controller 200 may retrieve a test-well identifier associated with an empty test well 134A, for example, from a stored table (e.g., in main memory 215 or secondary memory 220) that lists test-well identifiers associated with empty test wells 134. Controller 200 may then retrieve the most recently stored PTID (e.g., from main memory 215 or secondary memory 220) that is associated with the retrieved test-well identifier of test well 134A, and use the position indicated in the retrieved PTID as the position of test well 134A.

After determining the positions of sample 114A, reagent 124, and test well 134A, controller 200 may determine the optimal set of movements to align all of the determined positions with station 140X along the X-axis. In the illustrated example, controller 200 determines to move sample conveyor 110 and testing conveyor 130 in one direction along the Y-axis, and move reagent conveyor 120 in the opposite direction along the Y-axis. Then, controller 200 simultaneously and independently moves the respective conveyors according to the determined optimal set of movements to align the positions of sample 114A, reagent 124, and test well 134A with station 140X.

Figure 4B:
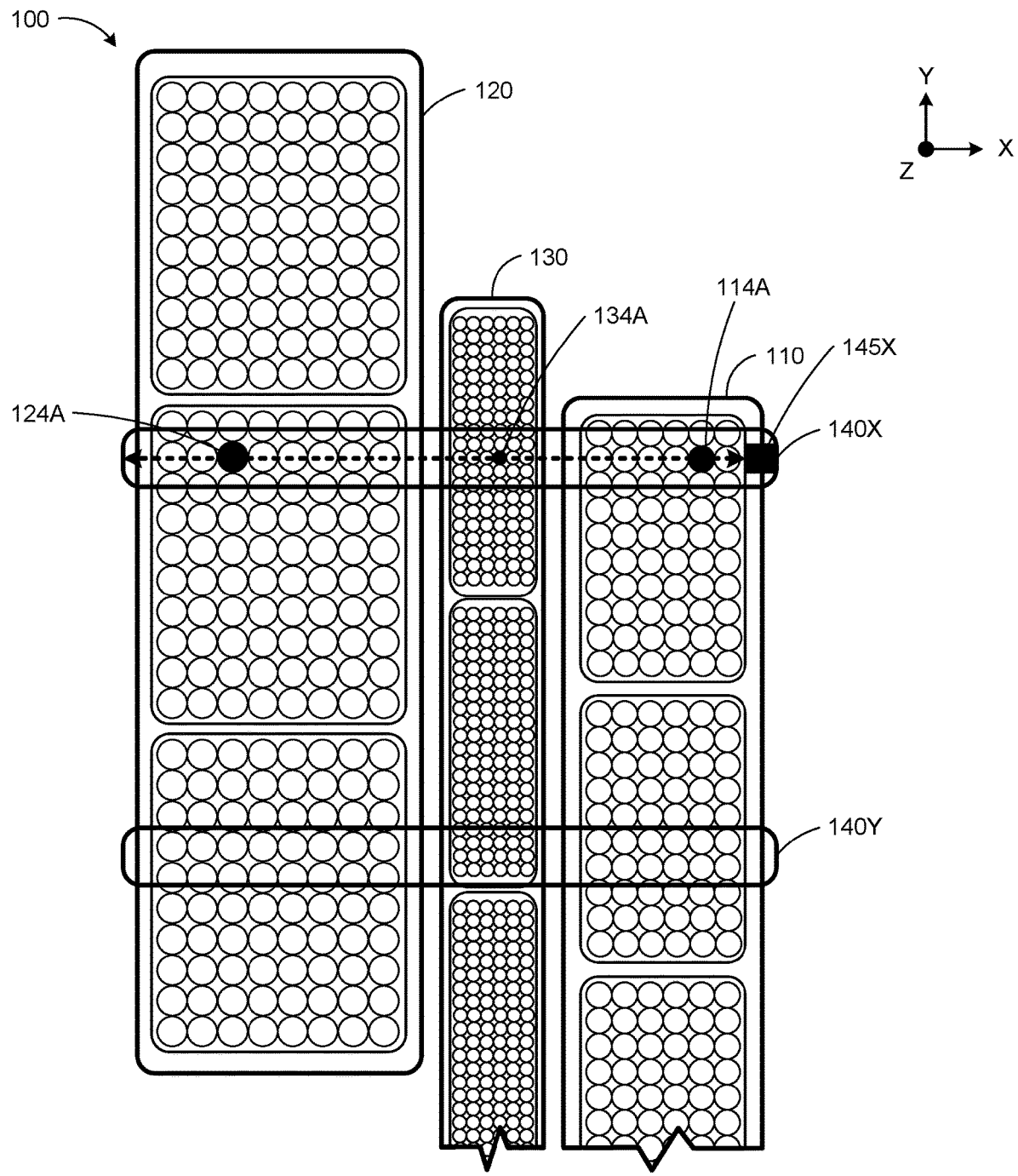

Next, as illustrated in FIG. 4B, controller 200 may move a tool 145X of station 140X along the X-axis to perform an operation of mixing sample 114A and reagent 124A in test well 134A. In particular, station 140X may comprise a bridge that spans sample conveyor 110, reagent conveyor 120, and testing conveyor 130, and tool 145X may comprise a pipette that moves along the underside of station 140X. Controller 200 may move tool 145X along the X-axis until the pipette is above reagent 124A, lower the pipette along the Z-axis, operate the pipette to aspirate fluid from reagent 124A, raise the pipette along the Z-axis, move tool 145X along the X-axis until the pipette is above test well 134A, lower the pipette along the Z-axis, operate the pipette to dispense the fluid from reagent 124A into test well 134A, and then raise the pipette along the Z-axis. At this point, controller 200 may replace or clean the pipette using any suitable technique. For example, controller 200 may control tool 145X to dispose of an old pipette tip and attach a new pipette tip from a set of clean pipette tips stored on a conveyor (e.g., an accessory conveyor), clean the old pipette tip in a cleansing well on a conveyor (e.g., an accessory conveyor), and/or the like. Next, controller 200 may move tool 145X along the X-axis until the pipette is above sample 114A, lower the pipette along the Z-axis, operate the pipette to aspirate fluid from sample 114A, raise the pipette along the Z-axis, move tool 145X along the X-axis until the pipette is above test well 134A, lower the pipette along the Z-axis, operate the pipette to dispense the fluid from sample 114A into test well 134A, and then raise the pipette along the Z-axis. At this point, controller 200 may again replace or clean the pipette using any suitable technique.

Figure 4C:
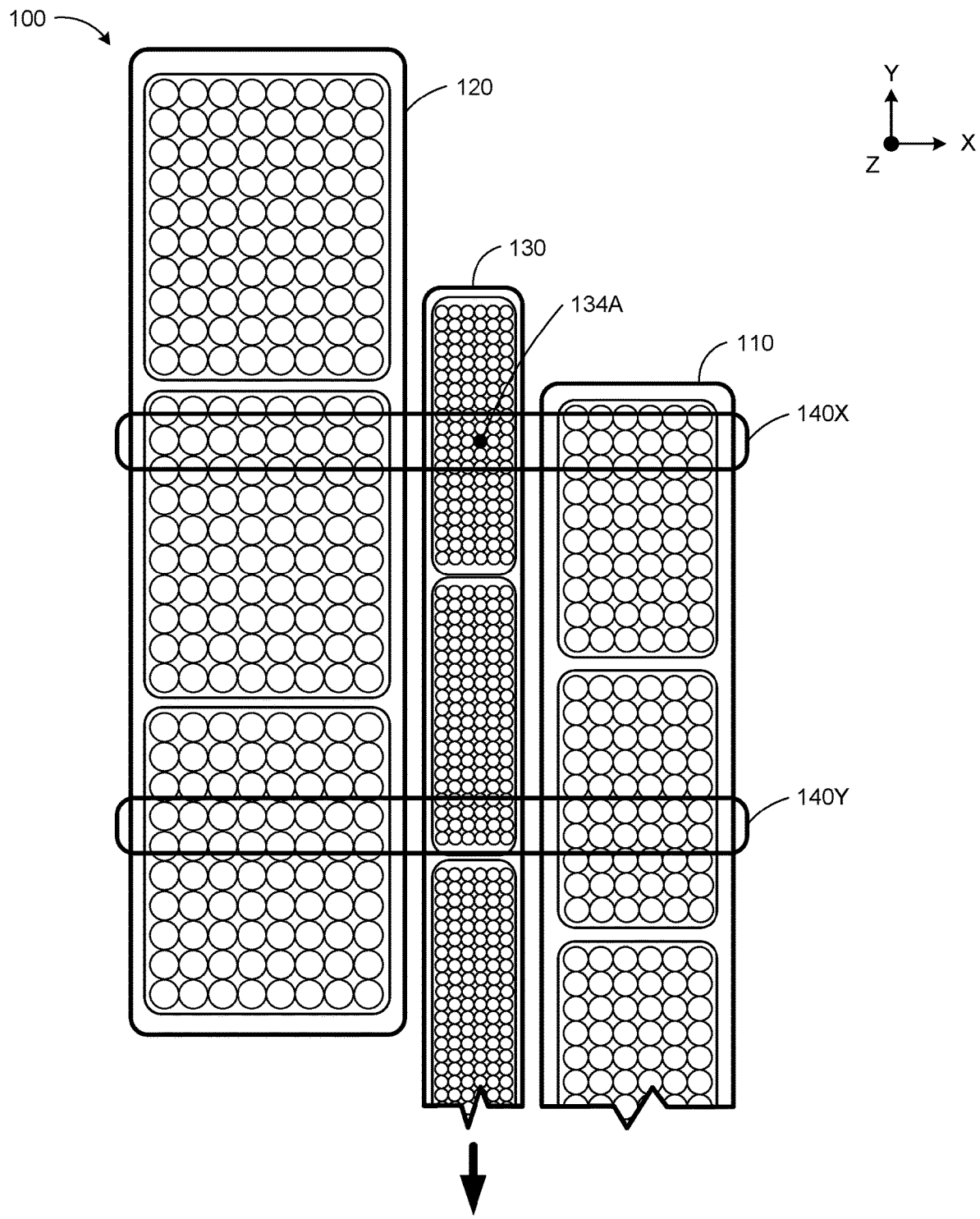

Next, as illustrated in FIG. 4C, after performing the operation at station 140X, controller 200 may determine the optimal movement to align test well 134A with station 140Y along the X-axis. In the illustrated example, controller 200 determines to move testing conveyor 130 along the Y-axis, such that the position of test well 134A moves towards station 140Y. Then, controller 200 moves testing conveyor 130 according to the determined movement to align the position of test well 134 with station 140Y.

Figure 4D:
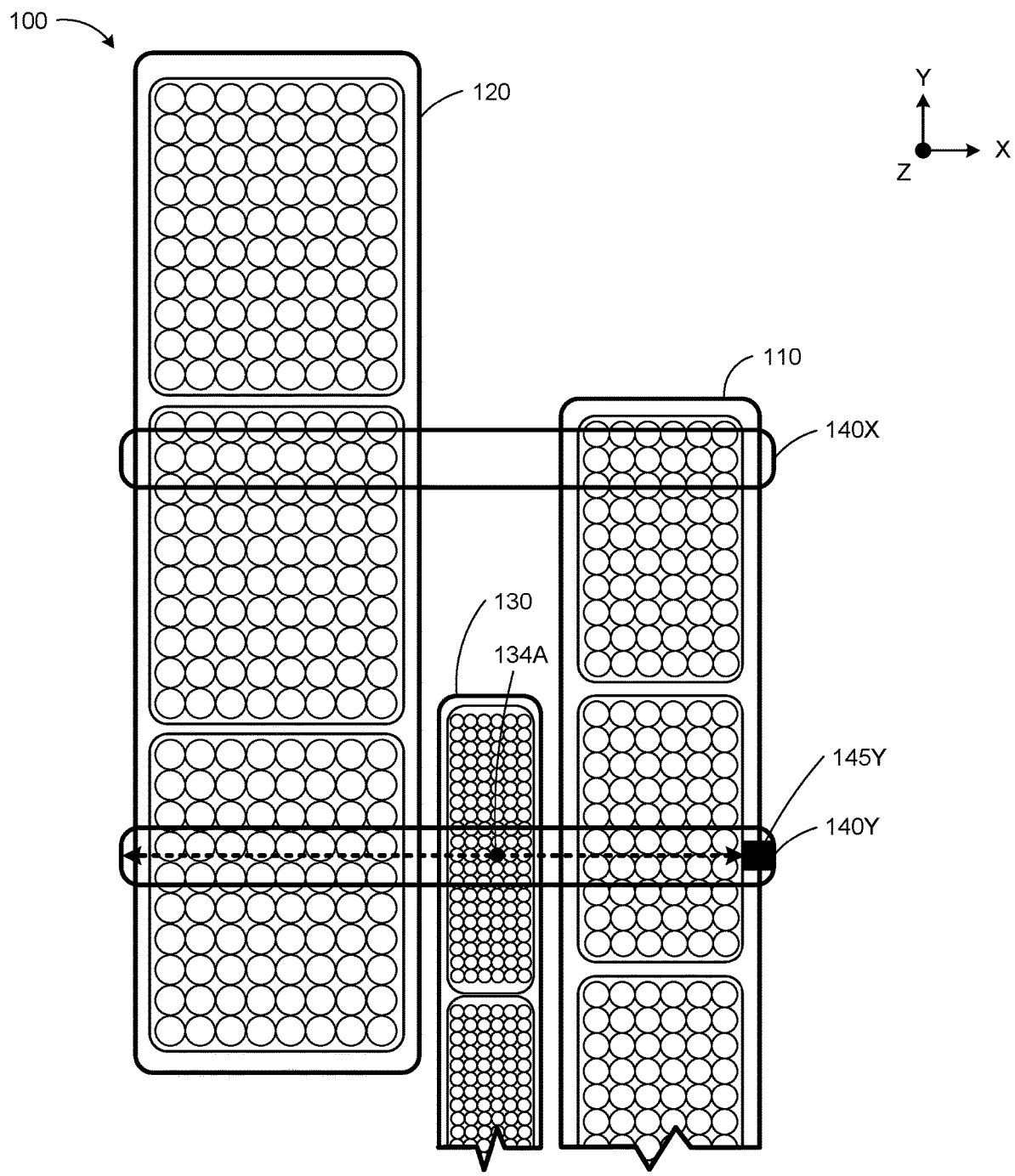

Finally, as illustrated in FIG. 4D, controller 200 may move a tool 145Y of station 140Y along the X-axis to perform an operation of reading the result in test well 134A. In particular, station 140Y may comprise a bridge that spans testing conveyor 130, and tool 145Y may comprise a camera, photometer, spectrophotometer, or other imaging sensor. Controller 200 may move tool 145Y along the X-axis until the imaging sensor is above test well 134A, and sense an image of the mixture in test well 134A. The sensed image may then be utilized by controller 200 to determine a result of the analysis and/or sent to an external system 245 to determine the result of the analysis.

5. Place-Time Identification

In an embodiment, place-time identifiers (PTIDs) are used to identify all items within total lab automation system 100. PTID allows controller 200 to register every stored item, and, at each of a plurality of points in time, including the current time, the conveyor on which the item is stored and the position of the item on that conveyor. This allows controller 200 to track every item moved, every event that takes place, and the workload of every station 140, and store a detailed history of daily operations for total lab automation system 100. This makes it possible to schedule the day's operations at a high level of detail and granularity. It also makes it possible to create a detailed computer model that accurately tracks the physical operation of total lab automation system 100 in real time. In addition, data analytics can be applied to the tracked data to enable vast improvements in system efficiency.

As discussed herein, items may be stored on the plurality of conveyors (e.g., as opposed to fixed shelves which require human or robotic stowers and pickers). This eliminates the need for storage cabinets and refrigerators, and the transportation of items to individual analyzers. In an embodiment, each item (e.g., sample 114, reagent 124, test well 134, etc.), each tray (e.g., sample tray 112, reagent tray 122, testing tray 132, etc.), each segment of the top surface of each conveyor, and/or each tool 145, within total lab automated system 100, is associated with a PTID. Additionally or alternatively, each position on each conveyor and/or any other system component (e.g., station 140) may be associated with a PTID. In addition, each event that occurs in total lab automation system 100, such as an operation performed at a station 140, may be associated with a PTID that indicates the location (e.g., along each of the X-axis, Y-axis, and/or Z-axis) and time at which that event occurred. For simplicity, all of the items, segments, tools 145, positions, stations 140, events, or other components that are associated with a PTID may be referred to herein collectively as "entities" or singularly as an "entity."

Each PTID for an entity may comprise at least an entity identifier, the location of the entity relative to a conveyor, the location of the entity relative to the ground, and the time at which the entity was at the location. A PTID may comprise other attributes of the entity, as well. These other attributes may depend on the particular entity being identified. For example, a PTID for a sample 114 may also comprise a patient identifier, time of accession, time of expiration, priority, identifier for each ordered test and whether or not the test has been completed, and/or the like. In practice, the PTID may comprise a tuple of values representing each of these attributes. In some cases, the PTID may be the sole identifier of items and/or other entities within total lab automation system 100.

PTIDs enable controller 200 to move items, stored on the conveyors, en masse, identified solely by their location and time. Controller 200 can deliver individual items or groups of items to specific, fixed destinations, in parallel, at a specified time with simple one-dimensional movements that do not require any navigation. At all times, controller 200 knows what item(s) have to move, where each item is on each conveyor, as well as where and when to move each item.

PTIDs also enable controller 200 to model and identify events. Thus, controller 200 may schedule, track, execute, and log all events. Monitored events may be those occurring at stations 140 (e.g., pipetting, analyzing, reading, etc.), at a particular segment (e.g., loading, stowing, etc.), and/or anywhere else within total lab automation system 100. Controller 200 may maintain a real-time model of what is occurring in total lab automation system 100, to be used for modeling past and future events of total lab automation system 100, as well as to, for example, identify conveyors, stations 140, and/or other components that need servicing.

PTIDs provide extreme flexibility. For example, during a batch run of tests, the batch run may be instantly paused and the PTIDs saved, so that an urgent test could be run with a different arrangement of conveyors. After that urgent test has completed, controller 200 can return all of the conveyors to their positions at the time that the batch run was paused, as represented by their saved PTIDs, and then resume the batch run. Thus, unlike conventional systems which are first-come-first-serve, PTIDs allow flexibility in the order in which operations can be performed by allowing total lab automation system 100 to return to a previous state (e.g., by saving and recalling the PTIDs for that state).

In an embodiment, each PTID comprises a vector. In turn, the vector of a PTID may comprise a plurality of sub-vectors. These sub-vectors may include, without limitation, a C-vector, an S-vector, a G-vector, a T-vector, and/or a W-vector. However, it should be understood that the PTID may comprise fewer, more, or different sub-vectors. For example, additional sub-vectors may be added to PTIDs in order to pack additional information into the PTID (e.g., to improve operations).

Each C-vector or component vector may be a one-dimensional vector that indicates on which specific component (e.g., conveyor) an entity (e.g., sample 114, reagent 124, test well 134, etc.) is located. For example, the C-vector for an item may comprise a unique identifier of the conveyor on which the item is held.

Each S-vector or surface vector may comprise a set of one or more coordinates, referred to herein as S-coordinates, that identify a fixed position of the entity on the component that is identified by the C-vector. It should be understood that the S-vector may represent a fixed position on a surface that may move, for example, if the surface is the top surface of a conveyor. In an embodiment, the S-vector comprises Cartesian X and Y coordinates in two-dimensional Euclidean space, about a fixed origin point on the particular surface of the particular component (e.g., top surface of a particular conveyor). The set of X-Y coordinates in the S-vector represents a unique position on the surface.

Each G-vector or ground vector may comprise a set of one or more coordinates, referred to herein as G-coordinates, that identify a position about a fixed origin point on the ground (e.g., the ground surface under total lab automation system 100). In an embodiment, the G-vector comprises Cartesian X and Y coordinates in two-dimensional Euclidean space, about the fixed origin point. Each set of X-Y coordinates in the G-vector represents a unique position on the ground. In an embodiment, each G-vector comprises real-world Global Positioning System (GPS) coordinates (e.g., latitude and longitude, and optionally elevation) or similar coordinates defined for a particular space (e.g., housing of total lab automation system 100, the floor of a laboratory, etc.).

Each T-vector or time vector may comprise a time coordinate (e.g., timestamp). Each time coordinate represents a point on a time axis, defining a real time or an elapsed time (e.g., from a fixed, starting point in time, like a stop-watch), and can be used to monitor individual tasks. For example, the T-vector may be used to instruct controller 200 to schedule delivery of an item to a station 140 at a particular time. The T-vector can also be used to perform triage, such as prioritizing tasks (e.g., movements of various items), and dealing with the most important (e.g., time-sensitive) tasks first. The T-vector also allows for all events (e.g., movements, processing, etc.) to be scheduled and logged. The T-vector enables a history of past operations in total lab automation system 100 to be collected and stored, as well as the projection and scheduling of future operations. The history of past operations may be used for data analytics, for example, to optimize the efficiency of total lab automation system 100.

Each W-vector or "what" vector may be a vector that indicates what the represented entity is. For example, the W-vector may comprise an identifier that identifies the represented entity as an item or type of item (e.g., sample 114, reagent 124, test well 134, etc.), an event, a segment of a conveyor, conveyor, or other component of total lab automation system 100, and/or the like. In other words, the W-vector indicates what kind of entity the PTID is identifying. As such, the W-vector is a coordinate in another dimension that represents a type classification. The W-vector allows controller 200 to identify what type of entity is being identified by a particular PTID, for example, so that controller 200 can distinguish between the different entities.

In general, each of the plurality of items in total lab automation system 100 will be associated with a PTID, and the PTID, for each of the plurality of items held on the top surface of one of the plurality of conveyors, may comprise at least an S-vector that identifies a relative location of the item on the top surface of the conveyor, and a T-vector that identifies a time at which the item is at the relative location identified in the S-vector. In addition, as mentioned elsewhere, in an embodiment, the top surface of each conveyor is divided into a plurality of segments. Each segment of each conveyor may be permanently associated with a unique pair of C-vector and S-vector that, together, uniquely identify the segment's position within total lab automation system 100.

Each segment of each conveyor may also have its own system of S-coordinates. For example, each segment may have its own Euclidean space, defined by X and Y coordinates. Thus, once the S-vector of a segment is specified, the S-coordinates in the S-vectors of all of the PTIDs for all items on that segment can be computed based on the S-coordinate system of the segment. In other words, the segments in Euclidean space may be defined by a set of S-coordinates (e.g., a listing of S-coordinates or a range of S-coordinates). One or more S-coordinates from this set of S-coordinates for a segment can be assigned to individual items on the segment. A large item may be assigned multiple S-coordinates if it takes up an area covering multiple S-coordinates. Alternatively, such an item may be assigned a single S-coordinate that represents the "center of gravity" of such an item. Essentially, each segment can be segmented into its own system of segments holding items or portions of items.

A distinct S-vector system may be utilized for each conveyor in total lab automation system 100. In such an embodiment, two entities could have the same S-vector (i.e., representing that the two entities are in the same location with respected to a fixed point on their respective surfaces), but would have different C-vectors (i.e., because the two entities are on different components). Alternatively, all of the components could be defined in a single, shared Euclidean space, especially in the case in which the top surfaces of all of the components are within the same plane. In such an embodiment, the C-vector may not be necessary, since all S-coordinates in all of the S-vectors may be defined using a single reference point. In other words, the S-vector alone can be used to uniquely identify an entity's physical location within total lab automation system 100.

The Euclidean space of the S-vector system may be superimposed on an underlying ground Euclidean space of the G-vector system (e.g., underlying the tabletop surface 105). Both Euclidean spaces may have the exact same dimensions, and the Euclidean space of the S-vector system may directly relate to the ground Euclidean space of the G-vector system about a fixed origin point on the ground Euclidean space beneath tabletop surface 105. The choice for the origin point will depend on the implementation and application of total lab automation system 100, and there may be multiple origin points. As discussed above, S-coordinates of items on moving surfaces, such as the top surfaces of the conveyors, may move over time relative to the G-coordinates of those items. However, because of the relationship between the S-vector system and the G-vector system, points in the S-vector system may be tied to fixed points in the G-vector system. In addition, positions of items and/or conveyors may be constantly monitored (e.g., as they pass under or over one or more stations 140).

In the manner described above, an item can be associated with a PTID, so that its exact location throughout total lab automation system 100 can be tracked by controller 200. In other words, the exact location of an item within total lab automation system 100 can be identified using its assigned PTID. Controller 200 tracks the PTIDs of all items within total lab automation system 100 at all times, and may control their movements without human intervention.

In an embodiment, controller 200 may utilize an optical or mechanical system (e.g., optical reading stations 140 that optically scan codes on items and/or segments of the conveyors as they pass) to continually determine the G-vector for a given S-vector based on the relationship of the fixed origin point of the G-vector and S-vector systems. In other words, controller 200 can determine the exact position of a conveyor—and therefore, items on the conveyor—at any given moment. Accordingly, controller 200 may calculate the G-coordinate of any item on any conveyor, regardless of whether the conveyor is stopped or in motion. This enables controller 200 to control the G-coordinate of any item, for example, by moving the item from one G-coordinate to another G-coordinate. This can be important for quality control in the PTID system.

Relational databases (e.g., stored in secondary memory 220) may be used to track items via their PTIDs. Specifically, each item may be associated in a relational database with a PTID. The PTID may be used as an index or key into the relational database of items. For example, an S-vector may be used as an index into a table of items, to retrieve all or a subset of information about one or more items having that S-vector. Alternatively or additionally, a combination of a G-vector and T-vector may be used as an index into the table of items. Alternatively or additionally, any other sub-vectors or combination of sub-vectors or any indicium reading (e.g., captured by a reading station 140) may be used as an index into the table of items. The items may be associated, in the relational database, with other data as well, such as an item identifier (e.g., Stock Keeping Unit (SKU)), one or more item descriptors, and/or the like. A relational database may persistently record every movement of every item as an event. For example, a row may be stored in a movement table that identifies the item that was moved, the PTID of the source of the movement, the PTID of the destination of the movement, the time of the movement, and/or the like. This history of movements can be used for a variety of applications, including auditing, debugging, calculating royalties for use of total lab automation system 100, and/or the like.

As mentioned elsewhere herein, in an embodiment, total lab automation system 100 enables random access of any item or row of items stored on any conveyor and/or of any segment of any conveyor. For example, each item and/or segment may be individually addressed by a PTID. Controller 200 may receive an instruction for random access to an item or segment. The instruction may comprise an identifier of the item and/or the S-vector or full PTID of the segment, and may be received from another component of total lab automation system 100, from an external system 245, from an operator via a graphical user interface of total lab automation system 100, and/or the like. If the instruction comprises an identifier of the item, controller 200 may map the identifier to an S-vector or full PTID that identifies the segment and conveyor on which the item is located. Otherwise, if the instruction comprises the S-vector or full PTID, this S-vector or PTID readily identifies the segment and conveyor to be randomly accessed to controller 200. In either case, once the segment has been identified, controller 200 may then control the conveyor, comprising the segment, to move the segment into a position in which it may be accessed. For example, the access position may be a position that is accessible to a station 140, loading area (e.g., for stowing or picking), and/or the like.

As long as an item is positioned on a particular conveyor, there is no need to continue tracking the item via reading methods (e.g., barcode readers), since the location of the item may be fixed at its associated S-vector for the duration of its use. Thus, advantageously, since items are processed in place, once an item's position has been identified once (e.g., by reading its associated barcode or other machine-readable indicia at a particular S-vector, for example, during loading), it does not need to be identified again. The preferred operating principle is to establish PTIDs of items as early in the process as possible, and just once.

A pairing of a T-vector with either an S-vector or G-vector can be thought of as a metonymous name or key that labels and identifies items, and which controller 200 can use to specify and control operations within total lab automation system 100. A pairing of a G-vector with a W-vector could name an item. Advantageously, PTIDs allow controller 200 to identify many disparate types of entities by vector values. For example, controller 200 can execute artificial intelligence (AI) algorithms, such as machine-learning algorithms, that use this PTID-based knowledge of items and stations 140 to self-optimize total lab automation system 100.

As discussed elsewhere herein, controller 200 may track and update each S-vector in the PTID of any moving item or component, relative to the G-vector system, by monitoring positions of the conveyors. During this tracking, controller 200 may also dynamically update the T-vector of the PTID for the moving item or component. Thus, controller 200 can track any moving entity, both as to its current location and its future location at any particular moment in time. In addition, controller 200 may store a history of all movements, operations, and/or other events within total lab automation system 100 (e.g., in secondary memory 220). It should be understood that this history may comprise all events up to the current time. In addition, controller 200 can store all scheduled events for the future (e.g., in secondary memory 220). Thus, controller 200 can use this constantly updated information to identify what is at a certain G-vector (i.e., ground location) at any T-vector (i.e., time), without having to employ an S-vector.

PTIDs also enable controller 200 to schedule events. For example, controller 200 could schedule a C-vector and S-vector (i.e., a particular position on a surface of a particular conveyor) at a particular G-vector and W-vector (i.e., a particular thing at a particular ground position) at a particular T-vector (i.e., at a particular time). In this manner, controller 200 could schedule this particular PTID to line up a particular item or segment in front of a particular station 140. In addition, a combination of a C-vector, G-vector, and T-vector can model any event (e.g., processing a given sample 114 at a given station 140).

PTIDs may also be used by controller 200 for triage. For example, assume there are a lot of orders for tests at a hemostasis station 140. The ability of controller 200 to make reservations at the station 140 would be worthwhile, since it will be important to ensure that no hemostasis time slots are wasted and that there are no delays in getting a sample 114 to the hemostasis station 140 for its reserved time slot. Controller 200 can use one or more algorithms (e.g., machine-learning or other AI algorithms) to utilize the PTID vectors and optimize scheduling. For example, the algorithm(s) may optimize reservations, optimize queuing of items (e.g., near the hemostasis station 140), ensure that conveyors are free to transport items to the hemostasis station 140 in time for their reservations, and/or the like. As soon as tests are ordered by a physician or when a sample 114 is accessioned at total lab automation system 100, all operations for all tests ordered for the sample 114 may be scheduled into specific time slots (i.e., T-vectors) at each required station 140 (e.g., pair of G-vector and W-vector). In addition, urgent test orders may be given priority and triage, such that other tests of other samples 114 may be delayed and/or rescheduled if necessary, to enable urgent test orders to be conducted before lower-priority orders.

In an embodiment, controller 200 performs quality control on the PTIDs. For example, automated reading stations 140 may be positioned selectively throughout total lab automation system 100 to read machine-readable indicia on items, passing by on conveyors, to confirm that the identity being provided by the PTID is correct. Specifically, the machine-readable indicia may be used to retrieve an item and its PTID, and the retrieved PTID may be compared to the PTID that corresponds to the position in front of the automated reading station 140 that captured the machine-readable indicia, according to the tracking by controller 200. If the PTIDs match, then the PTIDs are aligned with reality. Otherwise, if the PTIDs do not match, then the PTIDs are misaligned, and a recalibration process may be initiated, an immediate alarm (e.g., indicating a malfunction) may be raised (e.g., sounded or sent to a human operator), and/or the like. Instances of PTID verification can be done as a statistical sampling, to ensure that the PTID system is properly aligned, thereby providing continuous confidence in the integrity of the PTIDs. In a further safeguard, machine-readable indicia (e.g., Quick Response (QR) codes) may be printed on the top surface of the conveyors (e.g., on one or more or all segments), to thereby label locations to be sampled by an automated reader station 140 for PTID verification on a statistical basis.

In an embodiment, controller 200 monitors and records the current position of every conveyor. For example, in an embodiment which uses stepper motors to move the conveyors, controller 200 may count the pulses sent to the stepper motors of the conveyors to track their current positions. Alternatively, controller 200 may read machine-readable indicia on the conveyors as they pass automated reading stations 140, as described above. In either case, if there is a misalignment or malfunction of the PTIDs, controller 200 can use this information to bring the PTIDs back into alignment within total lab automation system 100.

In an embodiment, one or more, and potentially all, of the conveyors may be magnetic conveyors. Magnetic conveyors use magnets to releasably fix ferrous trays or items to the top surface of the conveyor. This can be used to ensure that the items on the surface of the conveyor remain at a precise S-vector, even during movement of the conveyor. Notably, the items themselves do not need to be ferrous, but could be in a particular application. For example, the items may be arranged in ferrous trays, as discussed elsewhere herein. In this case, controller 200 may calculate individual PTIDs for the items, based on the PTID of the tray in which they are arranged.

6. Just-In-Time Alignment

PTIDs can provide instant, integrated feedback, which facilitates just-in-time and Kaizen systems. For example, PTIDs enable controller 200 to schedule all movements and operations within a future time period (e.g., a workday). As soon as a test is ordered on a Laboratory Information System (LIS) (e.g., by a physician), total lab automation system 100 may use the PTID for the sample 114 to be tested to make reservations for the sample 114 at accession and at each station 140 of one or more analytic modules. All movements and operations within total lab automation system 100 may be modeled and scheduled (e.g., based on a stored history of movements, operations, and/or other events), to improve quality control, throughput, efficiency, load, invoicing, advanced data analytics, and/or the like. Thus, for example, if one station 140 will be busy during a particular time period, total lab automation system 100 can schedule testing to prevent back-ups at that station 140 and/or perform other tasks in parallel, to thereby improve throughput.

For example, returning to process 300, when determining the co-locate two or more items, controller 200 may also determine a time at which to co-locate the two or more items. Then, controller 200 may control the respective conveyors on which the two or more items are held, so that the positions of all of the two or more items become aligned along the X-axis at the precise time that was previously determined. This ensures that these items are only at station 140 for as long as necessary to be processed, which improves efficiency in the utilization of stations 140 within total lab automation system 100.

In an embodiment, the just-in-time alignment may be so precise that, for example, a tool 145 comprising a pipette of a measured aliquot of a specific reagent 124 may be hovering over a specific test well 134 at a precise time so as to be dispensed into the test well 134 at that precise time. To achieve this precision, controller 200 may calculate the timing required for each operation that must be performed to place the pipette with the measured aliquot of the specific reagent 124 at that precise location at that precise time, determine a start time for the operation by subtracting the calculated timings of the operations from the precise time, and then begin the operations at the determined start time. The operations may require moving testing conveyor 130 along the Y-axis such that the PTID-identified position of the specific test well 134 is under a pipetting station 140, moving reagent conveyor 120 along the Y-axis such that the PTID-identified position of the specific reagent 124 is under the pipetting station 140, moving the pipette of tool 145 of the pipetting station 140 along the X-axis until the pipette is over the specific reagent 124, lowering the pipette along the Z-axis to contact and aspirate the measured aliquot of the specific reagent 124 into the pipette, raise the pipette along the Z-axis, move the pipette along the X-axis until the pipette is over the specific test well 134, and lower the pipette along the Z-axis until the pipette is hovering over the specific test well 134. In an embodiment, controller 200 will not start the operations unless all of the necessary items for each operation are available at the timings required for each operation. This ensures that there will be no delays, with potentially millisecond precision.

7. Example Embodiment

Figure 5:
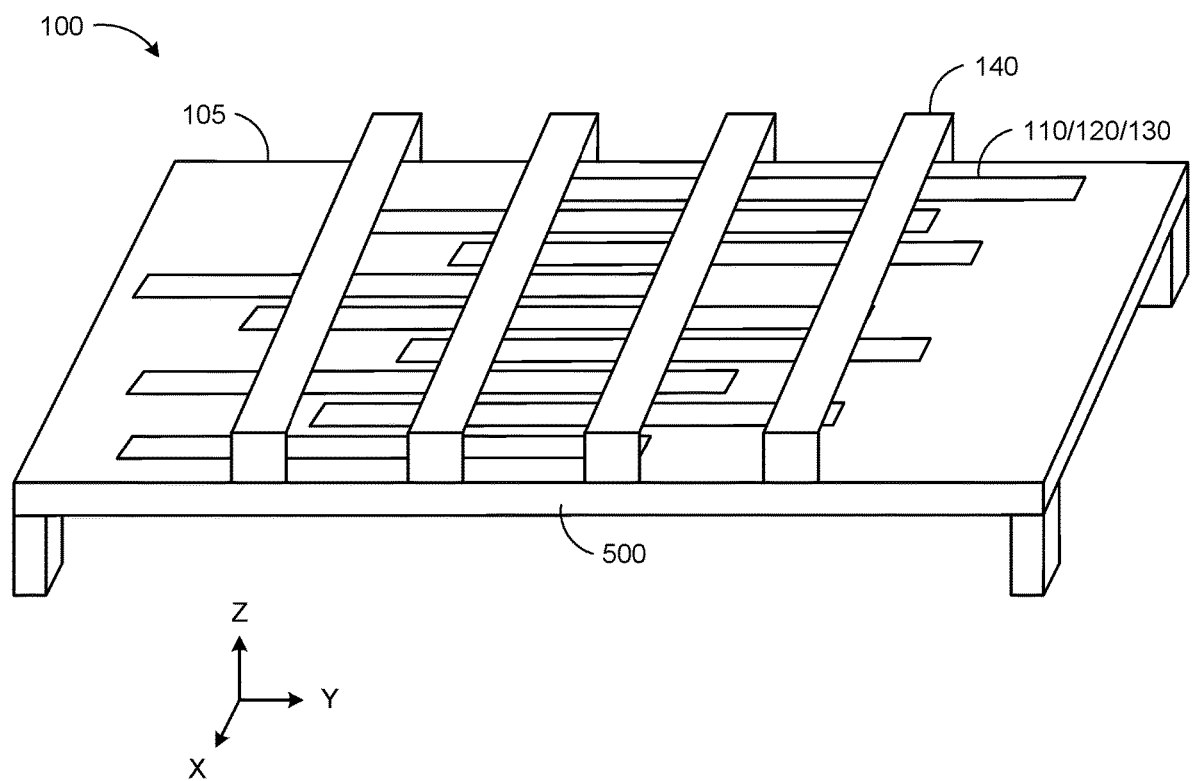
FIG. 5 illustrates a perspective view of a total lab automation system, according to an embodiment.

FIG. 5 illustrates a perspective view of total lab automation system 100, according to an embodiment. As illustrated, total lab automation system 100 may comprise a tabletop 500 with tabletop surface 105. A plurality of conveyors, including, for example, one or more sample conveyors 110, one or more reagent conveyors 120, one or more testing conveyors 130, and/or one or more other conveyors (e.g., accessory conveyors), may be arranged in parallel along the X-axis on tabletop surface 105, such that each conveyor is movable in both directions along the Y-axis in simple one-dimensional movements. In addition, one or more stations 140 may extend across tabletop surface 105 along the X-axis, such that each station 140 spans the plurality of conveyors. Tool 145 of one or more of these stations 140 may be configured to move along the Z-axis, potentially to pick up an item that can be tracked in terms of its three-dimensional position along the X-axis, the Y-axis, and the Z-axis. Total lab automation system 100 may be manufactured at a fraction of the cost and consume a fraction of the space of state-of-the-art laboratory analyzers, while having higher throughput than state-of-the-art laboratory analyzers.

Total lab automation system 100 may be preloaded with samples 114, reagents 124, test wells 134, and/or all accessories required for a menu of one or more, and generally a plurality of, tests for a given time period (e.g., one week). For example, total lab automation system 100 may comprise one or more loading and/or unloading stations 140. An operator may provide items to a loading station 140, and controller 200 may determine a conveyor and a position on the conveyor at which to load the item, move the determined position of the determined conveyor to the loading station 140, and utilize tool 145 of the loading station 140 to stow the item at the determined position on the determined conveyor. Conversely, controller 200 may determine an item to be unloaded (e.g., based on a number of uses, a determination that the item is completely used, expired, or no longer needed, etc.), determine the position of the item, move the conveyor on which the item is held so that the position of the item is aligned with the unloading station 140, and utilize tool 145 of the unloading station 140 to remove the item from total lab automation system 100. Alternatively, total lab automation system 100 may comprise one or more loading bays that enable an operator to load and unload trays of items. Each loading bay may comprise a camera or other imaging sensor that, whenever a tray is loaded into the loading bay, automatically detects and identifies the tray (e.g., by scanning a barcode on the tray), assigns a PTID to the tray, and/or detects or otherwise determines the position of each item on the tray and associates each item with a PTID (e.g., by automatically computing each item's PTID based on the PTID of the tray). Conversely, when a tray is to be discarded (e.g., because all items on the tray are determined to have expired), controller 200 may move the tray to the loading bay, where an operator may remove and discard the tray. Advantageously, controller 200 may utilize the PTIDs of items within total lab automation system 100 to automatically manage real-time inventories of the items, including the loading and unloading of items.

Total lab automation system 100 may be communicatively connected, via communication interface 240, to an external system 245, such as an LIS system. The LIS system may send orders to total lab automation system 100 according to the menu of test(s). Total lab automation system 100 may autonomously receive and process those orders, and return the results of those orders to the LIS system. In particular, controller 200 may control the conveyors and stations 140, as described throughout the present disclosure, to perform operations, such as centrifuging samples 114, de-capping samples 114, resealing samples 114, aspirating aliquots, pipetting samples 114 and reagents 124 into test wells 134, washing particle and red blood cells, incubating test wells 134, moving test wells 134 to reading stations 140, measuring analytes according to one or more, including potentially all, of the main analytic methods, and/or the like.

A total lab automation system 100 for two-hundred or more analytes may comprise a dozen or more parallel conveyors with a plurality of analytic modules, each comprising one or more stations 140. For example, total lab automation system 100 may at least comprise an analytic module for each of the main analytic methods. Notably, many of these analytic modules utilize the same or similar pre-analytic and/or post-analytic operations. Advantageously, such analytic modules may share one or more stations 140 to perform these pre-analytic and/or post-analytic operations, to thereby eliminate the redundancy in state-of-the-art systems that utilize a discrete analyzer for each analytic method. In other words, each analytic module may be virtually defined as a set of one or more shared stations 140 for pre-analytic and/or post-analytic processing that overlap with other analytic module(s), and potentially one or more dedicated stations 140 for the analytic processing, unless the analytic processing also overlaps with another analytic module. Total lab automation system 100 is scalable from a small system consisting of a single analytic module, to a medium system comprising two or more analytic modules, to a large system comprising all of the main analytic modules, to a massive system having the ability to operate each analytic module in parallel (e.g., with three-way redundancy), and anywhere between and beyond. Advantageously, all of the discrete analyzers in state-of-the-art systems can be replaced with a single total lab automation system 100.

The virtual analytic modules may be assembled on the fly, in real time, on demand, and as needed, from a compact superset of operations implemented by stations 140. Thus, a new test capability may be added to total lab automation system 100 by simply defining a new virtual analytic module from the existing superset of operations implemented by stations 140, and potentially adding new reagents 124 to reagent conveyor 120. In this case, the new test capability can be added by controller 200 receiving a software update, comprising the definition of the analytic module, from an external system 245, via communication interface 240, and installing the software update. Thus, the menu of tests available to be performed by total lab automation system 100 may be easily expanded or otherwise modified over time.

In an embodiment, the movement of the conveyors may be synchronized like an assembly line, which enables tasks to be performed with fewer and simpler movements. In other words, the conveyors may be stepped through a station 140, to align successive rows of items, along the X-axis with the station 140, to be processed as a cohort at the station 140. These parallel, short, rapid, one-dimensional movements do not require any navigation and are many times more efficient than the robotics required by state-of-the-art analyzers. With each step, each station 140 may operate on the items that are aligned with that station 140. In this manner, each row of items is efficiently processed at each station 140 in successive fashion.

In an embodiment, total lab automation system 100 may be capable of operating in either a batch mode or a "stat" mode. In batch mode, controller 200 may synchronize the movements of the conveyors like an assembly line to move rows of items successively through stations 140 for processing, as described above. In stat mode, controller 200 may move one or more conveyors to provide random access of one or more items to one or more stations 140, as discussed elsewhere herein. Controller 200 may temporarily switch total lab automation system 100 from batch mode to stat mode in response to an urgent order that requires an unplanned task to be performed. Once this task is complete, controller 200 may switch total lab automation system 100 back from stat mode to batch mode (e.g., based on stored PTIDs).

Each station 140 in total lab automation system 100 may be configured to perform an operation on one or more items. As examples, station 140 may be configured to pipette samples 114, pipette reagents 124, dispense other fluids, such as water, cleaning fluid, or the like (e.g., aspirated from a well on one of the conveyors, delivered from a refillable fluid reservoir within total lab automation system 100 to station 140, delivered via an external pipeline fluidly connected to a port of total lab automation system 100 that is fluidly connected to station 140, etc.), read an analytic result (e.g., via imaging, sensing, etc.), unseal (e.g., de-cap) containers (e.g., vacutainers) of items, reseal containers (e.g., vacutainers) of items, inspect items, read barcodes or other machine-readable indicia on items or other components, move items from one conveyor to another conveyor, move items from a conveyor to a subsystem (e.g., centrifuge, heater, refrigerator, loading bay, etc.) that is internal or external to total lab automation system, move items from such a subsystem to a conveyor, heat an item, cool an item, apply an electrode or other device to an item, or the like.

Stations 140 may be modular components that can be added to or removed from total lab automation system 100 in a plug-and-play manner. Thus, a new station 140 may be easily added to total lab automation system 100, potentially with a software update, to add a new functional capability to total lab automation system 100. Conversely, an existing station 140 may be easily removed from total lab automation system 100, potentially with a software update, to remove or replace an existing functional capability of total lab automation system 100.

Notably, in total lab automation system 100, items generally do not need to be transported on or off the conveyors, except in the case that an item needs to be transferred to or from an internal or external subsystem. Rather, only aliquots of an item need to be transported on or off conveyors. This can be done using standard pipettes that move one-dimensionally along the X-axis of a station 140. This feature represents a significant efficiency improvement over state-of-the-art analyzers, which require the movement of items within the analyzer.

In an embodiment, all items may be associated with PTIDs, such that no barcode reading is required during operation of total lab automation system 100 (e.g., barcodes may be read once during loading of the items). In addition, events may be associated with PTIDs, such that the location and time of each event is recorded. Events may include any operation performed within total lab automation system 100, including each movement of a conveyor along the Y-axis, any movement of a tool 145 along the X-axis and/or Z-axis, any operation performed at a station 140, loading or unloading of a tray or individual item, and/or the like. The PTIDs for these events may be stored in an event table, and may include at least an S-vector that identifies a location of the event within total lab automation system 100, and a T-vector that identifies a time at which the event occurred or is to occur. Thus, as an example, it could be determined, from the event table, that a certain pipette at a certain station 140 pipetted a certain aliquot of fluid into a certain test well 134 on a certain testing conveyor 130 at a certain time, down to the millisecond.

Furthermore, future events may be planned ahead of time. For example, the event table may be include PTIDs for planned events (e.g., representing operations) in a future time period (e.g., the next day) based on pre-ordered tests representing tasks, "housekeeping" tasks, and/or the like. An entire day's workflow may be preplanned in this manner. The event table may be analyzed by an AI algorithm, such as a machine-learning algorithm, to optimize the workflow over the future time period. The event table may be recalculated or otherwise updated, in real time, as new orders are received, more samples 114 are accessioned, workloads at stations 140 change, orders are reprioritized (e.g., for triage when urgent orders are received), and/or the like.

The event table may comprise PTIDs for all of the planned events for the future time period, with each PTID identifying at least the event, the location of the event, and the time of the event. In an embodiment, the PTID for a planned event may comprise a C-vector, an S-vector, a PTID of each item involved in the event, an origin of each item involved in the event, the destination of each item involved in the event, a task identifier, a pipette to be used, an aliquot size, and/or the like.

The event table may comprise a plurality of task tables. A task table is a subset of the event table that represents all of the events required for a single task. In other words, the task table, for each task represented in the event table, encompasses all of the events in the event table that are involved in that task. A task table for a task can be extracted from the event table using the task identifier of that task as an index into the PTIDs of the events.

In an embodiment, controller 200 may monitor the event table and trigger one or more actions in response to the detection of each of one or more events within the event table. In other words, the occurrences of some events may triggers action(s) within total lab automation system 100. An action may comprise, adding a task (i.e., comprising one or more events) to the event table for a future time period, performing an operation at one or more stations 140, and/or the like. For example, an event representing an unusual test result may trigger a repeat test or one or more reflex tests. In general, controller 200 may monitor the plurality of events within the event table, and, in response to the occurrence of a particular event within the plurality of events, automatically trigger one or more actions.

As a specific exemplary embodiment, total lab automation system 100 may be configured to perform a type-and-screen panel for a blood bank. In this case, total lab automation system 100 may comprise sample conveyor 110 for storing and transporting samples 114, reagent conveyor 120 for storing and transporting reagents 124, and testing conveyor 130 for storing and transporting test wells 134. Sample conveyor 110 may hold sample trays 112, with each sample tray 112 consisting of ten rows and ten columns, such that each sample tray 112 is capable of holding one-hundred samples 114. Reagent conveyor 120 may hold disposable reagent trays 122, with each reagent tray 122 holding a plurality of rows of reagents 124 in containers with access ports. Testing conveyor 130 may comprise a heat block that incubates test wells 134 to 37° Celsius (C). The heat block of testing conveyor 130 may hold testing trays 132, with each testing tray 132 consisting of eight rows and sixteen columns, such that each testing tray 132 has one-hundred-twenty-eight test wells 134. Sample conveyor 110, reagent conveyor 120, and testing conveyor 130 are all spanned by at least one station 140 that comprises a bridge with a pipettor tool 145. The pipettor tool 145 may comprise a ten-channel pipette that can access ten reagents 124 or ten test wells 134 at a time, and a one-channel pipette that can access one sample 114 or one test well 134 at a time. The access ports of reagents 124 may be in registration with the ten-channel pipette, such that the ten-channel pipette is able to simultaneously access the access ports of ten red-blood-cell (RBC) containers or plasma containers.

For a type-and-screen panel, controller 200 may move sample conveyor 110 to position the sample 114 to be tested under station 140, and move testing conveyor 130 to position a row of clean test wells 134 under station 140. The reagents 124 required for the test may stored on reagent conveyor 120 under station 140, such that controller 200 does not need to move reagent conveyor 120. Next, controller 200 may move the ten-channel pipette along the X-axis to simultaneously aspirate fifty microliters of ten RBC reagents 124 from reagent conveyor 120, and simultaneously dispense the aspirated RBC reagents 124 into ten test wells 134 on testing conveyor 130. Controller 120 may also move the one-channel pipette along the X-axis to aspirate five-hundred microliters of antibody from the sample 114 to be tested on sample conveyor 110, and dispense fifty microliters of the antibody into each of the ten test wells 134 containing the RBC reagent 124. Then, controller 200 may activate the heat block of testing conveyor 130 to incubate the ten test wells 134, now containing a mixture of the sample 114 and RBC reagent 124, for ten minutes at 37° C. It should be understood that, during this ten-minute period, total lab automation system 100 may perform other operations. Finally, controller 200 may move testing conveyor 130 to position the ten test wells 134 under a station 140 that reads (e.g., images) the ten test wells 134 after incubation.

8. Alternative Embodiment

Embodiments have primarily been described herein as comprising linear conveyors that move in two linear directions. However, in an alternative embodiment, total lab automation system 100 may comprise a plurality of annular conveyors that are concentric around the same Z-axis. U.S. Pat. No. 11,754,576, issued on Sep. 12, 2023, and U.S. Patent Pub. No. 2023/0331487, published on Oct. 19, 2023, which are both hereby incorporated herein by reference as if set forth in full, both illustrate and describe a system with such a plurality of annular conveyors. These annular conveyors may be combined with any of the stations 140, functions, processes, or other components or features of embodiments disclosed herein.

It should be understood that, instead of moving along the Y-axis, each annular conveyor will rotate within the X-Y plane around the same Z-axis. In addition, instead of aligning items or segments along the X-axis, segments of the annular conveyors may be aligned along any radial axis, including potentially the X-axis or Y-axis. Stations 140 may operate in the same manner as described herein, with a tool that moves along the longitudinal axis of station 140. The longitudinal axis of a station 140 may correspond to any radial axis. In addition to moving along the longitudinal axis of station 140, the tool of station 140 may also move along the Z-axis, as described elsewhere herein.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A total lab automation system comprising:
   a tabletop surface within a first plane that contains an X-axis and a Y-axis that is orthogonal to the X-axis;
   a plurality of conveyors mounted on the tabletop surface and arranged along the X-axis, wherein each of the plurality of conveyors extends along the Y-axis and is configured to move linearly and independently in two directions along the Y-axis, and wherein each of the plurality of conveyors comprises a top surface that is configured to hold a plurality of items;
   one or more stations that each extends along the X-axis to orthogonally span all of the plurality of conveyors, wherein each of the one or more stations comprises a bridge that orthogonally spans over all of the plurality of conveyors, and wherein each of the one or more stations comprises at least one tool that is configured to move in two directions along the X-axis; and
   a controller configured to control movement of each of the plurality of conveyors along the Y-axis, independently of any others of the plurality of conveyors, and movement of the tool of each of the one or more stations along the X-axis.

2. The total lab automation system of claim 1, wherein the tool of at least one of the one or more stations is configured to move in two directions along a Z-axis that is orthogonal to both the X-axis and the Y-axis.

3. The total lab automation system of claim 1, wherein the controller is further configured to:
   determine to co-locate two or more items, wherein each of the two or more items is held on a respective one of the plurality of conveyors that is different from any of the plurality of conveyors on which any of the other two or more items are held;
   for each of the two or more items, identify a position of that item on the respective conveyor; and
   move one or more of the respective conveyors on which the two or more items are held, until the positions of all of the two or more items are aligned along the X-axis.

4. The total lab automation system of claim 3, wherein the controller is configured to move the one or more of the respective conveyors on which the two or more items are held, until the positions of all of the two or more items are aligned along the X-axis with one of the one or more stations.

5. The total lab automation system of claim 4, wherein the controller is further configured to, once all of the two or more items are aligned along the X-axis with the one station, control the tool of the one station to perform an operation using each of the two or more items.

6. The total lab automation system of claim 3, wherein the controller is further configured to:

determine a time at which to co-locate the two or more items; and control the respective conveyors on which the two or more items are held, so that the positions of all of the two or more items become aligned along the X-axis at the determined time.

7. The total lab automation system of claim 1, wherein the top surfaces of all of the plurality of conveyors are located in a second plane that is parallel to the first plane.

8. The total lab automation system of claim 1, wherein the one or more stations are a plurality of stations, wherein a first subset of the plurality of stations is configured to perform a first analysis, and wherein a second subset of the plurality of stations is configured to perform a second analysis that is different from the first analysis.

9. The total lab automation system of claim 8, wherein the first analysis is performed according to a first one of a plurality of analytic methods, wherein the second analysis is performed according to a second one of the plurality of analytic methods that is different from the first analytic method, and wherein the plurality of analytic methods comprises two or more of urinalysis, hemostasis, immunology, allergy, chemistry, ion selective electrode (ISE), hematology, molecular, or microbiology.

10. A total lab automation system comprising:
a tabletop surface within a first plane that contains an X-axis and a Y-axis that is orthogonal to the X-axis;
a plurality of conveyors mounted on the tabletop surface and arranged along the X-axis, wherein each of the plurality of conveyors extends along the Y-axis and is configured to move linearly and independently in two directions along the Y-axis, wherein each of the plurality of conveyors comprises a top surface that is configured to hold a plurality of items, and wherein the plurality of conveyors comprises at least one sample conveyor whose top surface is configured to hold a plurality of samples as the plurality of items, at least one reagent conveyor whose top surface is configured to hold a plurality of reagents as the plurality of items, and at least one testing conveyor whose top surface is configured to hold a plurality of test wells as the plurality of items;
one or more stations that each extends along the X-axis to orthogonally span all of the plurality of conveyors, wherein each of the one or more stations comprises at least one tool that is configured to move in two directions along the X-axis; and
a controller configured to control movement of each of the plurality of conveyors along the Y-axis, independently of any others of the plurality of conveyors, and movement of the tool of each of the one or more stations along the X-axis.

11. The total lab automation system of claim 10, wherein the at least one testing conveyor is positioned between the at least one sample conveyor and the at least one reagent conveyor along the X-axis.

12. A total lab automation system comprising:
a tabletop surface within a first plane that contains an X-axis and a Y-axis that is orthogonal to the X-axis;
a plurality of conveyors mounted on the tabletop surface and arranged along the X-axis, wherein each of the plurality of conveyors extends along the Y-axis and is configured to move linearly and independently in two directions along the Y-axis, wherein each of the plurality of conveyors comprises a top surface that is configured to hold a plurality of items, wherein the top surface of each of the plurality of conveyors is divided into a plurality of segments along the Y-axis;
one or more stations that each extends along the X-axis to orthogonally span all of the plurality of conveyors, wherein each of the one or more stations comprises at least one tool that is configured to move in two directions along the X-axis; and
a controller configured to control movement of each of the plurality of conveyors along the Y-axis, independently of any others of the plurality of conveyors, and movement of the tool of each of the one or more stations along the X-axis.

13. A total lab automation system comprising:
a tabletop surface within a first plane that contains an X-axis and a Y-axis that is orthogonal to the X-axis;
a plurality of conveyors mounted on the tabletop surface and arranged along the X-axis, wherein each of the plurality of conveyors extends along the Y-axis and is configured to move linearly and independently in two directions along the Y-axis, wherein each of the plurality of conveyors comprises a top surface that is configured to hold a plurality of items, wherein each of the plurality of items is associated with a place-time identifier, and wherein the place-time identifier, for each of the plurality of items held on the top surface of one of the plurality of conveyors, comprises surface vector that identifies a relative location of the item on the top surface of the conveyor, and a time vector that identifies a time at which the item is at the relative location identified in the surface vector;
one or more stations that each extends along the X-axis to orthogonally span all of the plurality of conveyors, wherein each of the one or more stations comprises at least one tool that is configured to move in two directions along the X-axis; and
a controller configured to control movement of each of the plurality of conveyors along the Y-axis, independently of any others of the plurality of conveyors, and movement of the tool of each of the one or more stations along the X-axis.

14. The total lab automation system of claim 13, wherein each of a plurality of events in the total lab automation system is associated with a place-time identifier, and wherein the place-time identifier for each of the plurality of events comprises:
a surface vector that identifies a location of the event; and
a time vector that identifies a time at which the event occurred or is to occur.

15. The total lab automation system of claim 14, wherein the controller is further configured to manage an event table that comprises place-time identifiers for a set of planned events in a future time period.

16. The total lab automation system of claim 14, wherein the controller is further configured to:
monitor the plurality of events; and
in response to an occurrence of a particular event within the plurality of events, automatically trigger one or more actions.

17. A total lab automation system comprising:
a tabletop surface within a first plane that contains an X-axis and a Y-axis that is orthogonal to the X-axis;
a plurality of conveyors mounted on the tabletop surface and arranged along the X-axis, wherein each of the plurality of conveyors extends along the Y-axis and is configured to move linearly and independently in two directions along the Y-axis, wherein each of the plurality of conveyors comprises a top surface that is configured to hold a plurality of items;

one or more stations that each extends along the X-axis to orthogonally span all of the plurality of conveyors, wherein each of the one or more stations comprises at least one tool that is configured to move in two directions along the X-axis; and a controller configured to control movement of each of the plurality of conveyors along the Y-axis, independently of any others of the plurality of conveyors, and movement of the tool of each of the one or more stations along the X-axis, wherein each of the plurality of conveyors comprises a rack-and-pinion system configured to move the top surface along the Y-axis, and wherein the rack-and-pinion system is driven by a motor that is actuated by the controller.

* * * * *